US011321635B2

(12) United States Patent
Walton et al.

(10) Patent No.: US 11,321,635 B2
(45) Date of Patent: May 3, 2022

(54) METHOD FOR PERFORMING MULTI-AGENT REINFORCEMENT LEARNING IN THE PRESENCE OF UNRELIABLE COMMUNICATIONS VIA DISTRIBUTED CONSENSUS

(71) Applicant: Naval Information Warfare Center, Pacific, San Diego, CA (US)

(72) Inventors: Michael W. Walton, San Diego, CA (US); Benjamin J. Migliori, San Diego, CA (US); John Reeder, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 610 days.

(21) Appl. No.: 16/425,648

(22) Filed: May 29, 2019

(65) Prior Publication Data
US 2020/0380401 A1 Dec. 3, 2020

(51) Int. Cl.
*G06N 20/00* (2019.01)
*G06F 9/50* (2006.01)
*H04L 67/52* (2022.01)

(52) U.S. Cl.
CPC ......... *G06N 20/00* (2019.01); *G06F 9/5027* (2013.01); *H04L 67/18* (2013.01)

(58) Field of Classification Search
CPC ........ G06N 20/00; G06N 5/043; G06N 20/20; G06N 3/006; G06F 9/5027; G06F 7/023; H04L 67/18; H04L 41/16; H04N 21/251; H04N 21/466; H04N 21/45
See application file for complete search history.

(56) References Cited

U.S. PATENT DOCUMENTS

| | | | |
|---|---|---|---|
| 11,069,082 B1* | 7/2021 | Ebrahimi Afrouzi | ........................ H04N 5/2256 |
| 11,153,503 B1* | 10/2021 | Ebrahimi Afrouzi | .. G06V 10/25 |
| 11,274,929 B1* | 3/2022 | Afrouzi | ..................... G06T 7/55 |
| 2016/0205697 A1 | 7/2016 | Tan et al. | |
| 2018/0012137 A1 | 1/2018 | Wright et al. | |
| 2018/0165603 A1 | 6/2018 | Van Seijen et al. | |

(Continued)

OTHER PUBLICATIONS

Yu-Han Chang, Tracey Ho, and Leslie Pack Kaelbling. Multi-agent learning in mobilized ad-hoc networks. Jan. 2004.

(Continued)

*Primary Examiner* — Michael Won
(74) *Attorney, Agent, or Firm* — Naval Information Warfare Center Pacific; Kyle Eppele

(57) ABSTRACT

A system is provided for performing a predetermined function within a total area of operation, wherein the system includes a plurality of autonomous agents. Each autonomous agent is able to detect respective local parameters. Each autonomous agent uses a Kalman filter component to establish an environment state based a plurality of state measurements over time. The output of the Kalman filter component within a respective agent is applied to reinforcement learning by an actor-critic task controller, within the respective agent, to determine a subsequent action to be performed by the respective agent in accordance with a reward function. Each agent includes a Kalman consensus filter that addresses errors of the plurality of state measurements over time.

4 Claims, 20 Drawing Sheets

(56) References Cited

U.S. PATENT DOCUMENTS

| | | |
|---|---|---|
| 2018/0204111 A1 | 7/2018 | Zadeh et al. |
| 2018/0314266 A1 | 11/2018 | Shalev-Shwartz et al. |
| 2019/0339688 A1* | 11/2019 | Cella .................. G05B 23/0229 |
| 2020/0225673 A1* | 7/2020 | Ebrahimi Afrouzi ........................ G05D 1/0016 |
| 2020/0364456 A1* | 11/2020 | Tran ........................ G06F 3/017 |
| 2022/0057519 A1* | 2/2022 | Goldstein ............. G01S 17/894 |

OTHER PUBLICATIONS

Timothy P. Lillicrap et al. Continuous control with deep reinforcement learning. CoRR, abs/1509.02971, 2015.

Ryan Lowe, Yi Wu, Aviv Tamar, Jean Harb, Pieter Abbeel, and Igor Mordatch. Multi-agent actor-critic for mixed cooperative-competitive environments. CoRR, abs/1706.02275, 2017.

R. Olfati-Saber. Distributed kalman filtering for sensor networks. In 2007 46th IEEE Conference on Decision and Control, pp. 5492-5498, Dec. 2007.

L Xiao, Stephen Boyd, and Sanjay Lall. Distributed average consensus with time-varying metropolis weights. Jan. 2006.

Kaiqing Zhang, Zhuoran Yang, Han Liu, Tong Zhang, and Tamer Basar. Fully decentralized multi-agent reinforcement learning with networked agents. CoRR, abs/1802.08757, 2018.

\* cited by examiner

| Agent | Detected Parameters | Detected Agents/Target | Transmits | Receives | Determines |
|---|---|---|---|---|---|
| 106 | $p_{106}, v_{106}, a_{106}(t_1)$ $p_{102}(t_1)$ | 108, 110, 112, 102 | $p_{106}, v_{106}, a_{106}(t_1)$ (*1) $p_{102}(t_1)$ (*2) | $p_{108}, v_{108}, a_{108}(\delta_{108})(t_1)(V_{212})$ (*3) $p_{110}, v_{110}, a_{110}(\delta_{110})(t_1)(V_{214})$ (*4) $p_{112}, v_{112}, a_{112}(\delta_{112})(t_1)(V_{216})$ (*5) $p_{104}(\delta_{108})(t_1)(V_{212})$ (*6) $p_{104}(\delta_{110})(t_1)(V_{214})$ (*7) | |
| 108 | $p_{108}, v_{108}, a_{108}(t_1)$ $p_{104}(t_1)$ | 106, 110, 112, 114, 104 | $p_{108}, v_{108}, a_{108}(t_1)$ (*8) $p_{104}(t_1)$ (*9) | $p_{106}, v_{106}, a_{106}(\delta_{106})(t_1)(V_{212})$ (*10) $p_{110}, v_{110}, a_{110}(\delta_{110})(t_1)(V_{218})$ (*11) $p_{112}, v_{112}, a_{112}(\delta_{112})(t_1)(V_{220})$ (*12) $p_{114}, v_{114}, a_{114}(\delta_{114})(t_1)(V_{222})$ (*13) $p_{102}(\delta_{106})(t_1)(V_{214})$ (*14) $p_{104}(\delta_{110})(t_1)(V_{218})$ (*15) $p_{104}(\delta_{114})(t_1)(V_{222})$ (*16) | |
| 110 | $p_{110}, v_{110}, a_{110}(t_1)$ $p_{104}(t_1)$ | 106, 108, 104 | $p_{110}, v_{110}, a_{110}(t_1)$ (*17) $p_{104}(t_1)$ (*18) | $p_{106}, v_{106}, a_{106}(\delta_{106})(t_1)(V_{214})$ (*19) $p_{108}, v_{108}, a_{108}(\delta_{108})(t_1)(V_{218})$ (*20) $p_{102}(\delta_{106})(t_1)(V_{214})$ (*21) $p_{104}(\delta_{108})(t_1)(V_{218})$ (*22) | |
| 112 | $p_{112}, v_{112}, a_{112}(t_1)$ | 106, 108, 114 | $p_{112}, v_{112}, a_{112}(t_1)$ (*23) | $p_{106}, v_{106}, a_{106}(\delta_{106})(t_1)(V_{216})$ (*24) $p_{108}, v_{108}, a_{108}(\delta_{108})(t_1)(V_{220})$ (*25) $p_{114}, v_{114}, a_{114}(\delta_{114})(t_1)(V_{224})$ (*26) $p_{102}(\delta_{106})(t_1)(V_{216})$ (*27) $p_{104}(\delta_{108})(t_1)(V_{220})$ (*28) $p_{104}(\delta_{114})(t_1)(V_{224})$ (*29) | |
| 114 | $p_{114}, v_{114}, a_{114}(t_1)$ $p_{104}(t_1)$ | 108, 112, 104 | $p_{114}, v_{114}, a_{114}(t_1)$ (*30) $p_{104}(t_1)$ (*31) | $p_{108}, v_{108}, a_{108}(\delta_{108})(t_1)(V_{222})$ (*32) $p_{112}, v_{112}, a_{112}(\delta_{112})(t_1)(V_{224})$ (*33) $p_{104}(\delta_{108})(t_1)(V_{222})$ (*34) | |

FIG. 7

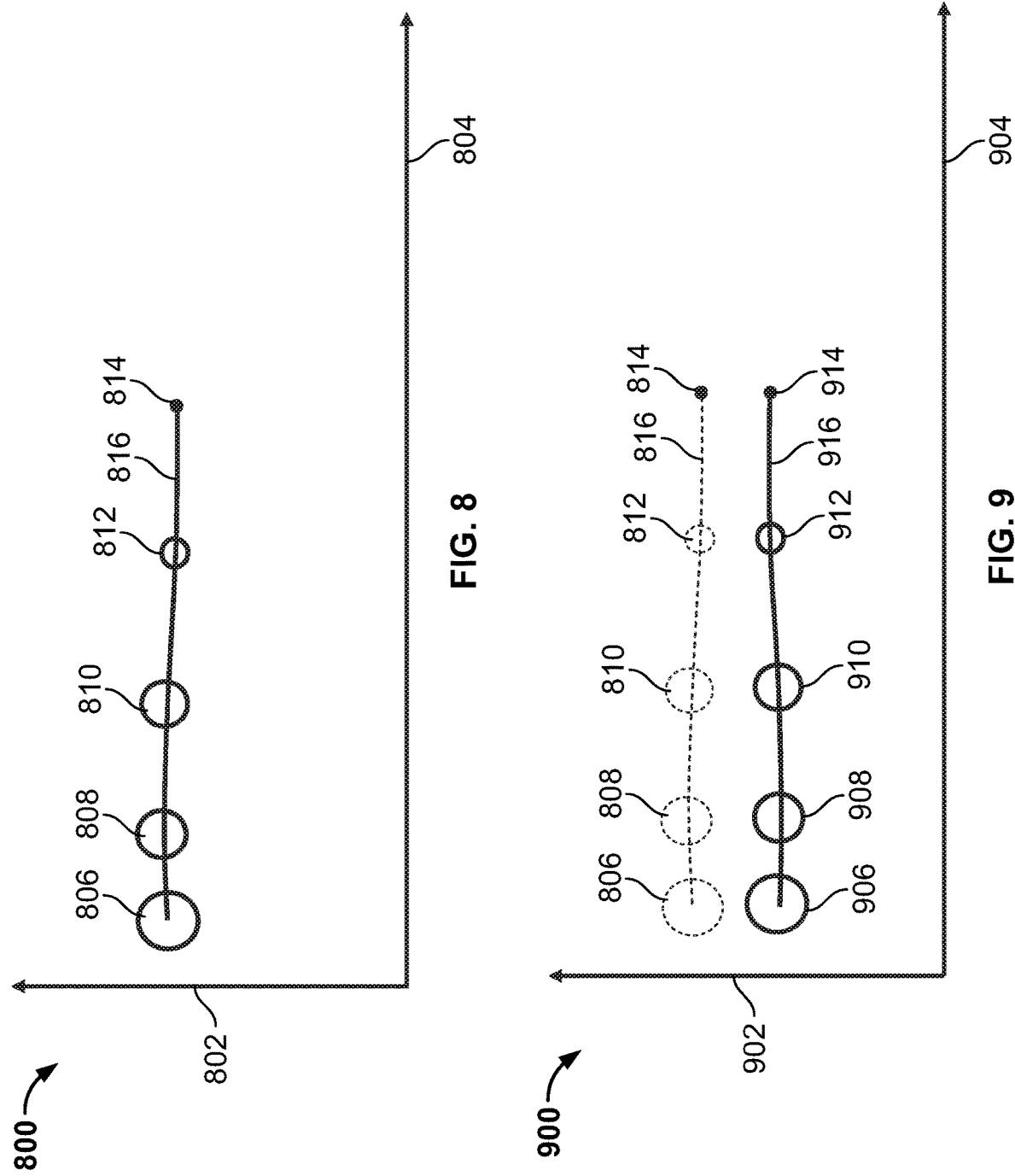

| Agent 1402 | Detected Parameters 1404 | Detected Agents/Target 1406 | Transmits 1408 | Receive 1410 | Determines 1412 |
|---|---|---|---|---|---|
| 106 | $p_{106}, v_{106}, a_{106}(t_2)$ $p_{102}(t_2)$ | 108, 112, 102 | $p_{106}, v_{106}, a_{106}(t_2)$ (*35) $p_{102}(t_2)$ (*36) (*3 - *7) | $p_{108}, v_{108}, a_{108}(\delta_{108})(t_2)(v_{1314})$ (*37) $p_{112}, v_{112}, a_{112}(\delta_{112})(t_2)(v_{1312})$ (*38) $p_{102}(\delta_{112})(t_2)/v_{1312})$ (*39) (*10-*16) $(v_{1314})$ (*40) (*24-*29) $(v_{1312})$ (*41) | $S_{106}(*1)$ $S_{108}(*3)$ $S_{110}(*4)$ $S_{112}(*5)$ $S_{102}(*2)$ $S_{104}(*6, *7)$ |
| 108 | $p_{108}, v_{108}, a_{108}(t_2)$ | 106, 110, 112, 114 | $p_{108}, v_{108}, a_{108}(t_2)$ (*42) (*10 - *16) | $p_{106}, v_{106}, a_{106}(\delta_{106})(t_2)(v_{1314})$ (*43) $p_{110}, v_{110}, a_{110}(\delta_{110})(t_2)(v_{1316})$ (*44) $p_{112}, v_{112}, a_{112}(\delta_{112})(t_2)(v_{1318})$ (*45) $p_{114}, v_{114}, a_{114}(\delta_{114})(t_2)(v_{1320})$ (*46) $p_{102}(\delta_{106})(t_2)(v_{1314})$ (*47) $p_{102}(\delta_{110})(t_2)(v_{1316})$ (*48) $p_{102}(\delta_{112})(t_2)(v_{1318})$ (*49) $p_{102}(\delta_{114})(t_2)(v_{1320})$ (*50) (*3-*7) $(v_{1314})$ (*51) (*19-*22) $(v_{1316})$ (*52) (*24-*29) $(v_{1318})$ (*53) (*32-*34) $(v_{1320})$ (*54) | $S_{106}(*10)$ $S_{108}(*8)$ $S_{110}(*11)$ $S_{112}(*12)$ $S_{114}(*13)$ $S_{102}(*14)$ $S_{104}(*9, *15, *16)$ |
| 110 | $p_{110}, v_{110}, a_{110}(t_2)$ $p_{104}(t_2)$ | 108, 114, 104 | $p_{110}, v_{110}, a_{110}(t_2)$ (*55) $p_{104}(t_2)$ (*56) (*19 - *22) | $p_{108}, v_{108}, a_{108}(\delta_{108})(t_2)(v_{1316})$ (*57) $p_{114}, v_{114}, a_{114}(\delta_{114})(t_2)(v_{1322})$ (*58) $p_{104}(\delta_{114})(t_2)(v_{1322})$ (*59) (*10-*16) $(v_{1316})$ (*60) (*32-*34) $(v_{1322})$ (*61) | $S_{106}(*19)$ $S_{108}(*20)$ $S_{110}(*17)$ $S_{102}(*24)$ $S_{104}(*18, *22)$ |

FIG. 14A

| Agent | Detected Parameters | Detected Agents/Target | Transmits | Receives | Determines |
|---|---|---|---|---|---|
| 112 | $p_{112}, v_{112}, a_{112}(t_2)$ $p_{102}(t_2)$ | 106, 108, 102 | $p_{112}, v_{112}, a_{112}(t_2)$ (*62) $p_{102}(t_2)$ (*63) (*24 - *29) | $p_{106}, v_{106}, a_{106}(\delta_{106})(t_2)(v_{1312})$ (*64) $p_{108}, v_{108}, a_{108}(\delta_{108})(t_2)(v_{1318})$ (*65) $p_{102}(\delta_{106})(t_2)(v_{1312})$ (*66) (*3-*7)(v_{1312}) (*67) (*10-*16)(v_{1318}) (*68) | $S_{106}$(*24) $S_{108}$(*25) $S_{112}$(*23) $S_{114}$(*26) $S_{102}$(*27) $S_{104}$(*28, *29) |
| 114 | $p_{114}, v_{114}, a_{114}(t_2)$ $p_{104}(t_2)$ | 108, 110, 104 | $p_{114}, v_{114}, a_{114}(t_2)$ (*69) $p_{104}(t_2)$ (*70) (*32 - *34) | $p_{108}, v_{108}, a_{108}(\delta_{108})(t_2)(v_{1320})$ (*71) $p_{110}, v_{110}, a_{110}(\delta_{110})(t_2)(v_{1322})$ (*72) $p_{104}(\delta_{108})(t_2)(v_{1320})$ (*73) (*10-*16)(v_{1320}) (*74) (*19-*22)(v_{1322}) (*75) | $S_{108}$(*32) $S_{112}$(*33) $S_{114}$(*30) $S_{104}$(*31, *34) |

FIG. 14B

| Agent | Detected Parameters | Detected Agents/Target | Transmits | Receives | Determines |
|---|---|---|---|---|---|
| 106 | $p_{106}, v_{106}, a_{106}(t_3)$ | 108, 110, 112 | $p_{106}, v_{106}, a_{106}(t_3)$ (*76)<br>$p_{106}, v_{106}, a_{106}(t_3)$ (*37 – *41) | $p_{108}, v_{108}, a_{108}(\delta_{108})(t_3)(\gamma_{1612})$ (*77)<br>$p_{110}, v_{110}, a_{110}(\delta_{110})(t_3)(\gamma_{1606})$ (*78)<br>$p_{112}, v_{112}, a_{112}(\delta_{112})(t_3)(\gamma_{1616})$ (*79)<br>$p_{104}(\delta_{108})(t_3)(\gamma_{1612})$ (*80)<br>$p_{104}(\delta_{110})(t_3)(\gamma_{1606})$ (*81)<br>$p_{102}(\delta_{112})(t_3)(\gamma_{1616})$ (*82)<br>(*43 - *54)(γ1612) (*83)<br>(*57 - *61)(γ1606) (*84)<br>(*64 - *68)(γ1616) (*85) | $S_{106}$(*1, *36)<br>$S_{108}$(*3, *37, *25)<br>$S_{110}$(*4)<br>$S_{112}$(*5, *38, *12)<br>$S_{114}$(*13, *26)<br>$S_{102}$(*39, *27)<br>$S_{104}$(*6, *7, *15, *16, *28, *29) |
| 108 | $p_{108}, v_{108}, a_{108}(t_3)$<br>$p_{104}(t_3)$ | 106, 110, 112, 114, 104 | $p_{108}, v_{108}, a_{108}(t_3)$(*86)<br>$p_{104}(t_3)$(*87)<br>(*43 - *54) | $p_{106}, v_{106}, a_{106}(\delta_{106})(t_3)(\gamma_{1612})$ (*88)<br>$p_{110}, v_{110}, a_{110}(\delta_{110})(t_3)(\gamma_{1618})$ (*89)<br>$p_{112}, v_{112}, a_{112}(\delta_{112})(t_3)(\gamma_{1620})$ (*90)<br>$p_{114}, v_{114}, a_{114}(\delta_{114})(t_3)(\gamma_{1622})$ (*91)<br>$p_{104}(\delta_{110})(t_3)(\gamma_{1618})$ (*92)<br>$p_{102}(\delta_{112})(t_3)(\gamma_{1620})$ (*93)<br>$p_{104}(\delta_{114})(t_3)(\gamma_{1622})$ (*94)<br>(*37 - *41)(γ1612) (*95)<br>(*57 - *61)(γ1618) (*96)<br>(*64 - *68)(γ1620) (*97)<br>(*71 - *75)(γ1622) (*98) | $S_{106}$(*10, *43, *19, *24)<br>$S_{108}$(*86, *8)<br>$S_{110}$(*11, *44, *4)<br>$S_{112}$(*12, *45, *5, *33)<br>$S_{114}$(*13, *46, *26)<br>$S_{102}$(*14, *47, *49, *21, *27)<br>$S_{104}$(*87, *15, *16, *48, *50, *6, *7, *22, *28, *29, *34) |

FIG. 17A

| Agent | Detected Parameters | Detected Agents/Target | Transmits | Receives | Determines |
|---|---|---|---|---|---|
| 110 | $p_{110}, v_{110}, a_{110}(t_3)$ $p_{104}(t_3)$ | 106, 108, 114, 104 | $p_{110}, v_{110}, a_{110}(t_3)$ (*99) $p_{104}(t_3)$ (*57 - *61) | $p_{106}, v_{106}, a_{106}(\delta_{106})(t_3)(v_{1614})$ (*101) $p_{108}, v_{108}, a_{108}(\delta_{108})(t_3)(v_{1618})$ (*102) $p_{114}, v_{114}, a_{114}(\delta_{14})(t_3)(v_{1624})$ (*103) $p_{104}(\delta_{114})(t_3)(v_{1624})$ (*104) $p_{104}(\delta_{108})(t_3)(v_{1618})$ (*105) (*37 - *41)(v_{1614}) (*106) (*43 - *54)(v_{1618}) (*107) (*71 - *75)(v_{1624}) (*108) | $S_{106}$(*19, *10) $S_{108}$(*20, *32, *57) $S_{110}$(*99, *17) $S_{112}$(*12, *33) $S_{114}$(*58, *13) $S_{102}$(*24, *14) $S_{104}$(*100, *22, *56, *15, *16, *34) |
| 112 | $p_{112}, v_{112}, a_{112}(t_3)$ $p_{102}(t_3)$ | 106, 108, 102 | $p_{112}, v_{112}, a_{112}(t_3)$ (*109) $p_{102}(t_3)$ (*110) (*64 - *68) | $p_{106}, v_{106}, a_{106}(\delta_{106})(t_3)(v_{1616})$ (*111) $p_{108}, v_{108}, a_{108}(\delta_{108})(t_3)(v_{1620})$ (*112) $p_{104}(\delta_{108})(t_3)(v_{1620})$ (*113) (*37 - *41)(v_{1616}) (*114) (*43 - *54)(v_{1620}) (*115) | $S_{106}$(*24, *64, *10) $S_{108}$(*25, *65, *3) $S_{110}$(*4, *11) $S_{112}$(*109, *23) $S_{114}$(*26, *13) $S_{102}$(*110, *27, *66, *14) $S_{104}$(*28, *29, *6, *7, *15, *16) |
| 1114 | $p_{114}, v_{114}, a_{114}(t_3)$ $p_{104}(t_3)$ | 108, 110, 104 | $p_{114}, v_{114}, a_{114}(t_3)$ (*116) $p_{104}(t_3)$ (*117) (*71 - *75) | $p_{108}, v_{108}, a_{108}(\delta_{108})(t_3)(v_{1622})$ (*118) $p_{110}, v_{110}, a_{110}(\delta_{110})(t_3)(v_{1624})$ (*119) $p_{104}(\delta_{108})(t_3)(v_{1622})$ (*120) $p_{104}(\delta_{110})(t_3)(v_{1624})$ (*121) (*43 - *54)(v_{1622}) (*122) (*57 - *61)(v_{1624}) (*123) | $S_{106}$(*10, *19) $S_{108}$(*32, *71, *20) $S_{110}$(*72, *11) $S_{112}$(*33, *12, *20) $S_{114}$(*116, *30) $S_{102}$(*14, *21) $S_{104}$(*117, *34, *73, *15, *16, *22) |

FIG. 17B

METHOD FOR PERFORMING MULTI-AGENT REINFORCEMENT LEARNING IN THE PRESENCE OF UNRELIABLE COMMUNICATIONS VIA DISTRIBUTED CONSENSUS

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc_pac_t2@navy.mil. Reference Navy Case No. 108875.

BACKGROUND OF THE INVENTION

Embodiments of the invention relate to systems of autonomous distributed agents that perform predetermined tasks.

Conventionally, systems of autonomous distributed agents may perform predetermined tasks through reinforcement learning. However, such systems lack efficiency as a result of errors in communication between the agents, and as a result of errors associated with the detectors of the agents.

There exists a need for a system and method for controlling autonomous agents to perform a predetermined task using reinforcement learning, which takes into account errors in communication and detection.

SUMMARY OF THE INVENTION

Aspects of the present disclosure provides a system and method for controlling autonomous agents to perform a predetermined task using reinforcement learning, which takes into account errors in communication and detection.

An aspect of the present disclosure is drawn to a system for performing a predetermined function within a total area of operation, wherein system includes a first autonomous agent, a second autonomous agent, and a third autonomous agent. The first autonomous agent includes a first agent detector, a first agent communication component and a first agent controller. The first agent detector is operable to detect a first agent parameter within a first agent area and to generate a first agent parameter signal based on the detected first agent parameter. The first agent controller is operable to instruct the first autonomous agent to perform an initial first agent task and to perform a subsequent first agent task. The second autonomous agent includes a second agent detector, a second agent communication component and a second agent controller. The second agent detector is operable to detect a second agent parameter within a second agent area and to generate a second agent parameter signal based on the detected second agent parameter. The second agent communication component is operable to transmit the second agent parameter signal to the first agent communication component. The second agent controller is operable to instruct the second autonomous agent to perform an initial second agent task and to perform a subsequent second agent task. The third autonomous agent includes a third agent detector, a third agent communication component and a third agent controller. The third agent detector is operable to detect a third agent parameter within a third agent area and to generate a third agent parameter signal based on the detected third agent parameter. The third agent communication component is operable to transmit the third agent parameter signal to the first agent communication component and to the second agent communication component. The third agent controller is operable to instruct the third autonomous agent to perform an initial third agent task and to perform a subsequent third agent task. The first agent communication component is operable to transmit the first agent parameter signal to the second agent communication component and to the third agent communication component. The second agent communication component is further operable to transmit the second agent parameter signal to the third agent communication component. The first agent controller is operable to instruct the first autonomous agent to perform the subsequent first agent task based on the first agent parameter signal, the second agent parameter signal, the third agent parameter signal and a predetermined reward function using reinforcement learning and a first Kalman consensus filter. The second agent controller is operable to instruct the second autonomous agent to perform the subsequent second agent task based on the first agent parameter signal, the second agent parameter signal, the third agent parameter signal and the predetermined reward function using reinforcement learning and as second Kalman consensus filter. The third agent controller is operable to instruct the third autonomous agent to perform the subsequent third agent task based on the first agent parameter signal, the second agent parameter signal, the third agent parameter signal and the predetermined reward function using reinforcement learning and a third Kalman consensus filter. The first agent area is less than and within the total area of operation. The second agent area is less than and within the total area of operation.

BRIEF DESCRIPTION OF THE DRAWINGS

The accompanying drawings, which are incorporated in and form a part of the specification, illustrate example embodiments and, together with the description, serve to explain the principles of the invention. In the drawings:

FIG. 7 illustrates a table of information related to the environment of the area of operation at time $t_1$ as shown in FIG. 2.

FIG. 8 illustrates an example output of a Kalman filter of the controller of FIG. 6.

FIG. 9 illustrates another example output of the Kalman filter of the controller of FIG. 6.

FIGS. 14A-B illustrate a table of information related to the environment of the area of operation at time $t_2$ as shown in FIG. 13.

FIGS. 17A-B illustrate a table of information related to the environment of the area of operation at time $t_3$ as shown in FIG. 16.

DETAILED DESCRIPTION OF THE EMBODIMENTS

Figure 1:
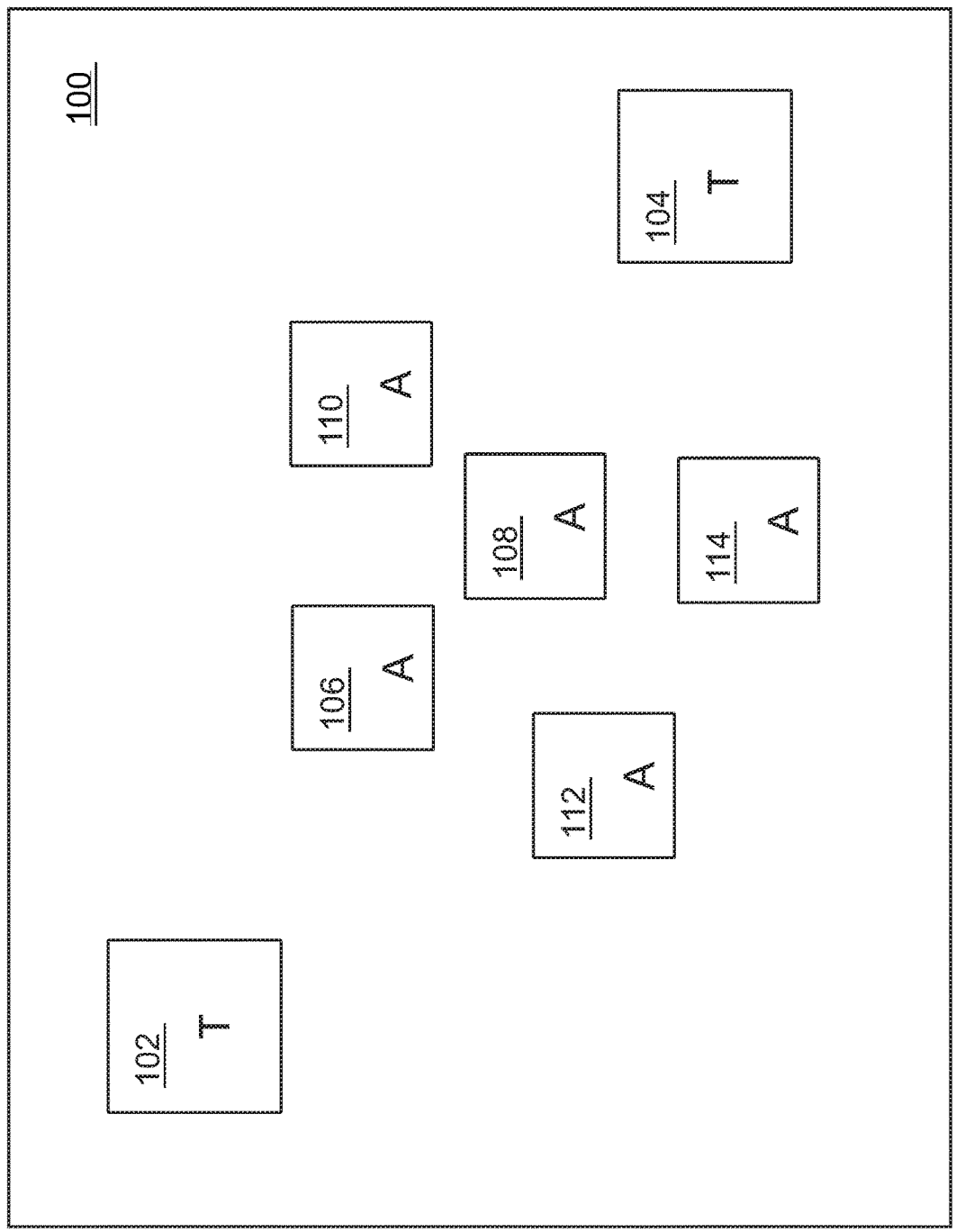
FIG. 1 illustrates an area of operation having autonomous agents and targets dispersed therein, at a time

The present disclosure describes a system and method for automatically selecting appropriate multi-agent behaviors in mixed cooperative-competitive control tasks. Uniquely, in a system in accordance with the present disclosure the agents only need to share local state information; this enables the multi-agent reinforcement problem (MARL) to be solved (i.e. to "converge") even with imperfect communication between distal agents. The output is a set of local agent policies defined as $\pi_i(\omega^i_t, \alpha_t)$ for each agent i as a learned function of a local transmission parameter $(\omega^i_t)$ and a partially observed local state $(s^i_t)$. An implementation of distributed consensus deep reinforcement learning, further described below, is used to accomplish this function.

In principle, Multi-Agent Reinforcement Learning (MARL) provides an attractive and flexible framework for distributed control of teams of autonomous systems. However, theoretical and practical limitations of the associated algorithms, originally designed for single-agent control tasks, undermine their optimality in multi-agent settings. In accordance with the present disclosure, a class of distributed control problems is considered in which a set of agents may leverage local, range limited communications to achieve a shared goal. The present disclosure builds on conventional work in mobilized ad-hoc networks incorporating modern techniques from deep reinforcement learning. Further, the present disclosure is not restricted a conventional purely cooperative case. On the contrary, the present disclosure is empirically shown to be feasible in partially competitive settings as well. Motivated by the distributed consensus literature, our agent control policies operate on the output of a linear combination of neighbors' transmission parameters. This approach preserves the global average, may be easily computed for each agent using only locally available information and guarantees asymptotic average consensus for mild assumptions on the stochastic communication graph.

The networked MARL problem may be formalized using similar notation as that disclosed in "Fully decentralized multi-agent reinforcement learning with networked agents" by Zhang et al. CoRR 2018. Let $\{G=(N, \varepsilon_t)\}_{t \geq 0}$ be an undirected time-varying communications graph between N agents in the network with $(i, j) \in \varepsilon_t$ denoting agent i and j communicate at time t. Further, let $d_t(i)$ denote the degree of node i and $N_t(i)$ be the neighbors of i at time t. On each timestep, each agent i makes a partial observation $s^i_t$ of the global state S via an observation function $O^i(S)$. The agent computes a local transmission parameter, $\omega^i_t$ to be broadcast to $N_t(i)$. Finally, the agent selects an available action $\alpha^i \in A^i$ according to its local policy $\pi_i(\omega^i t, \alpha_t)$. Cases are restricted to where the local parameter $\omega^i_t$ is some function F of only the current transmission parameter and local state $\omega^i_t = F(s^i_t, \omega^i_t)$. As a baseline, policies learned are asses using only the local current state $F(s^i_t, \omega^i_t) = s^i_t$ and an exponential moving average of the local state $F(s^i_t, \omega^i_t) = \beta s^i_t + (1-\beta) s^i_{t-t'}$.

This consensus update is computed by $\omega^i_{t+1} = \Sigma_{j \in N} c_t(i,j) \omega^j_t$ using message weights $c_t$. A natural choice for consensus update weights $c_t$ may be found in known time-varying Metropolis weights. The present disclosure defines the weight on each edge $c_t(i, j)$ as proportional to the degree of the incident nodes, with self-connections weighted such that the weights at each node form a convex combination.

$$c_t(i, j) = \begin{cases} (1 + \max[d_t(i), d_t(j)])^{-1} & (i, j) \in \varepsilon_i \\ 1 - \sum_{k \in N_t(i)} C_t(i, k) & i = j \\ 0 & \text{else}. \end{cases} \quad (1)$$

Distributed Kalman consensus filters are then used in which consensus estimates are integrated over each agent's local Kalman state estimate using the distributed average consensus condition defined above in Equation 1.

The control policies for each agent may be trained independently using known deep deterministic policy gradients. For each task, a cumulative return is reported for each consensus function. Via the Kalman consensus filter condition, agents propagate expected positions and velocities of all entities $\omega^i_t = \{\hat{x}^j_t, \hat{v}^j_t\}_{j \in N}$ inferred from position observations and a simple linear kinematics model with constant velocity.

An example embodiment of a system and method enabling a plurality of autonomous agents to execute a predetermined task within an area of operation in accordance with aspects of the present disclosure will now be described with reference to FIGS. 1-17B.

FIG. 1 illustrates an area of operation 100 having autonomous agents and targets dispersed therein, at a time $t_1$.

As shown in the figure, area of operation 100 includes a target 102, a target 104, an agent 106, an agent 108, an agent 110, agent 112 and an agent 114.

Each of agent 108, 110, 112 and 114 is an autonomous agent. Each agent has been programmed to autonomously perform tasks to execute an overall group task. In this example embodiment, the group task is to position the group of agents such that a continuous communication link is established between the agents, such that target 102 is detected by at least one agent and such that target 104 is detected by at least one agent.

Figure 2:
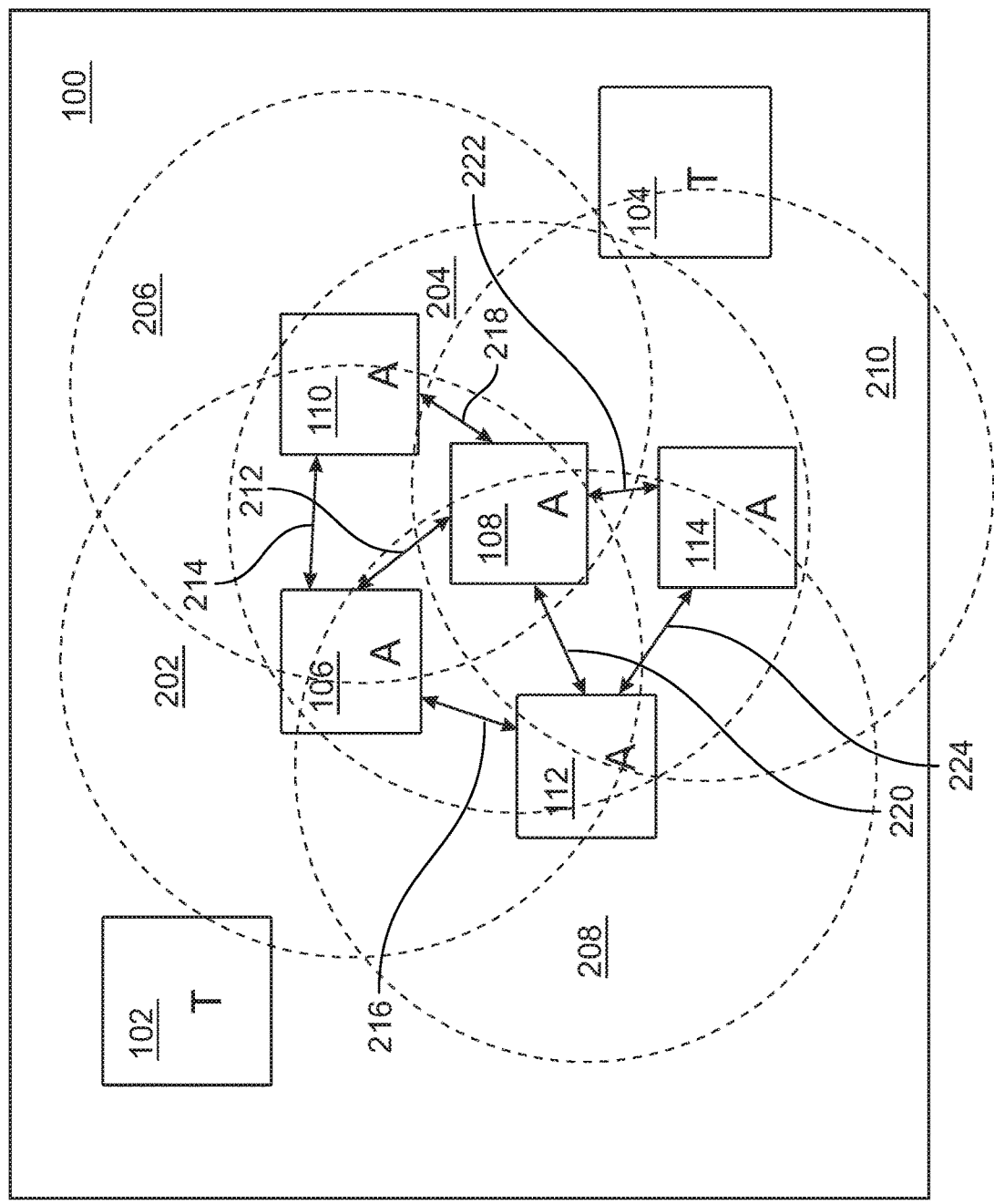
FIG. 2 illustrates the area of operation of FIG. 1, at time $t_1$, with local areas and communication channels associated with the autonomous agents.

FIG. 2 illustrates the area of operation of FIG. 1, at time $t_1$, with local areas and communication channels associated with the autonomous agents.

As shown in FIG. 2, agent 106 has a local detection area 202, agent 108 has a local detection area 204, agent 110 has a local detection area 206, agent 112 has a local detection area 208 and agent 114 has a location detection area 210.

Agent 106 is positioned such that agent 108, agent 110, agent 112 and target 102 are in local detection area 202.

Agent 108 is positioned such that agent 106, agent 110, agent 112, agent 114 and target 104 are in local detection area 204. Agent 110 is positioned such that agent 106, agent 108 and target 104 are in local detection area 206. Agent 112 is positioned such that agent 106, agent 108 and agent 114 are in local detection area 208. Agent 114 is positioned such that agent 108, agent 112 and target 104 are in local detection area 210.

In this example embodiment, any one agent is able to bi-directionally communicate with another agent that is within the agent's local area of detection. In particular, agent 106 is operable to bi-directionally communicate with agent 108 via a communication channel 212, to bi-directionally communicate with agent 110 via a communication channel 214 and to bi-directionally communicate with agent 112 via a communication channel 216. Agent 108 is additionally operable to bi-directionally communicate with agent 110 via a communication channel 218, to bi-directionally communicate with agent 112 via a communication channel 220 and to bi-directionally communicate with agent 114 via a communication channel 222. Agent 112 is additionally operable to bi-directionally communicate with agent 114 via a communication channel 224.

Figure 3:
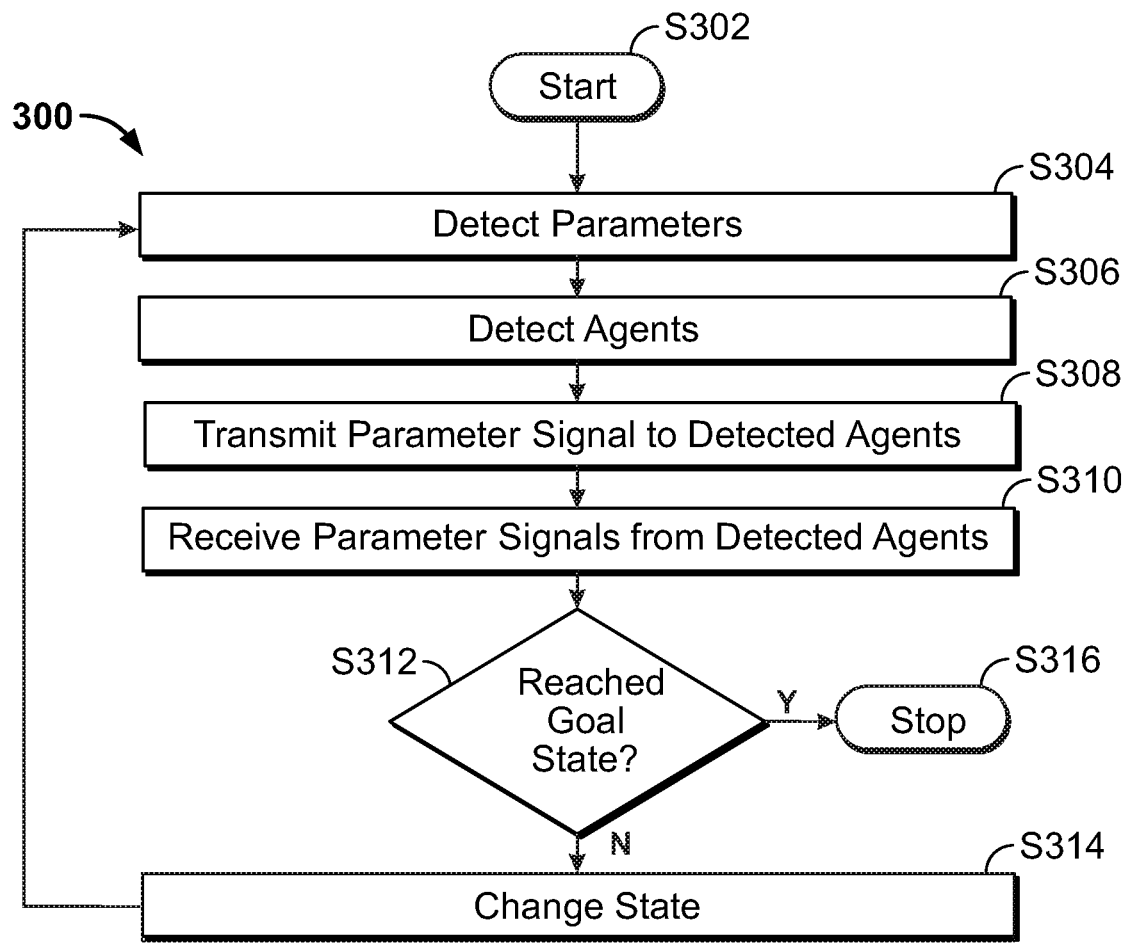
FIG. 3 a method 300 of performing a series of tasks with an autonomous agent of a group of autonomous agents to reach a goal state in accordance with aspects of the present disclosure.

FIG. 3 illustrates a method 300 of performing a series of tasks with an autonomous agent of a group of autonomous agents to reach a goal state in accordance with aspects of the present disclosure.

As shown in the figure, method 300 starts (S302) and parameters are detected (S304). For example, in this embodiment, an agent is able to detect its position, its velocity and its acceleration. Further, each agent is able to detect any other agents or any targets that are within its local detection area. This will be described in greater detail with reference to FIGS. 4-5.

Figure 4:
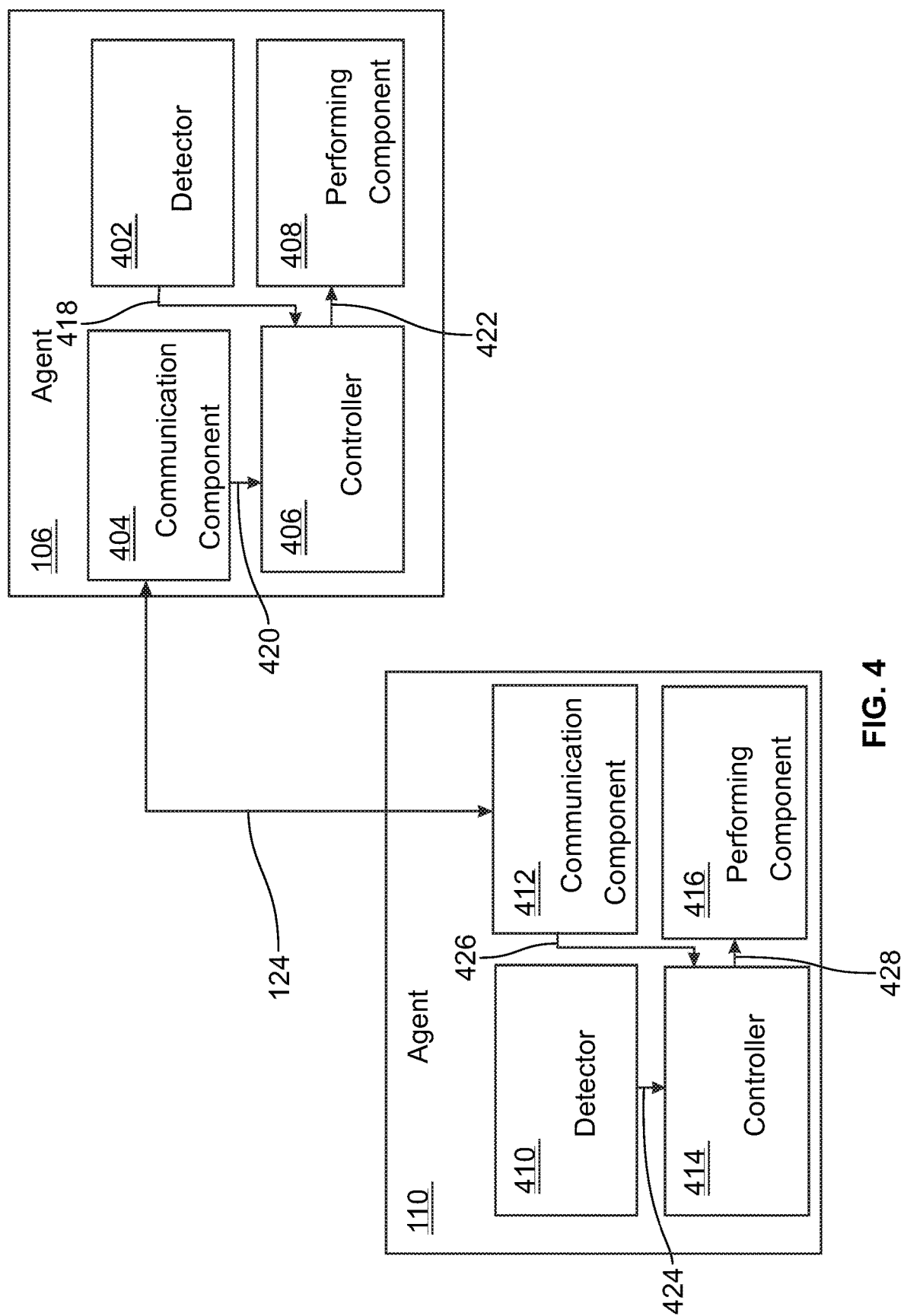
FIG. 4 illustrates an exploded view of two agents of FIG. 1.

FIG. 4 illustrates an exploded view of agent 106 and agent 110 of FIG. 1.

As shown in FIG. 4, agent 106 includes a detector 402, a communication component 404, a controller 406 and a performing component 408, whereas agent 110 includes a detector 410, a communication component 412, a controller 414 and a performing component 416.

In agent 106, communication component 404 is arranged to communicate with controller 406 via a communication channel 420 and to bi-directionally communicate with communication component 412 of agent 110 via a communication channel 124. Further, detector 402 is arranged to communicate with controller 406 via a communication channel 418. Still further, controller 406 is arranged to communicate with performing component 408 via a communication channel 422.

In agent 110, communication component 412 is arranged to communicate with controller 414 via a communication channel 426 and to bi-directionally communicate with communication component 404 of agent 106 via communication channel 124. Further, detector 410 is arranged to communicate with controller 414 via a communication channel 424. Still further, controller 414 is arranged to communicate with performing component 416 via a communication channel 428.

In this example, detector 402, communication component 404, controller 406 and performing component 408 are illustrated as individual devices. However, in some embodiments, at least two of detector 402, communication component 404, controller 406 and performing component 408 may be combined as a unitary device. Further, in some embodiments, at least one of detector 402, communication component 404, controller 406 and performing component 408 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

In this example, detector 410, communication component 412, controller 414 and performing component 416 are illustrated as individual devices. However, in some embodiments, at least two of detector 410, communication component 412, controller 414 and performing component 416 may be combined as a unitary device. Further, in some embodiments, at least one of detector 410, communication component 412, controller 414 and performing component 416 may be implemented as a computer having tangible computer-readable media for carrying or having computer-executable instructions or data structures stored thereon.

Detector 402 may be any known device or system that is operable to detect a parameter, non-limiting examples of which include non-limiting examples of which include position, velocity, acceleration, angular velocity, angular acceleration, sound, temperature, vibrations, pressure, biometrics, contents of surrounding atmosphere and combinations thereof.

Figure 5:
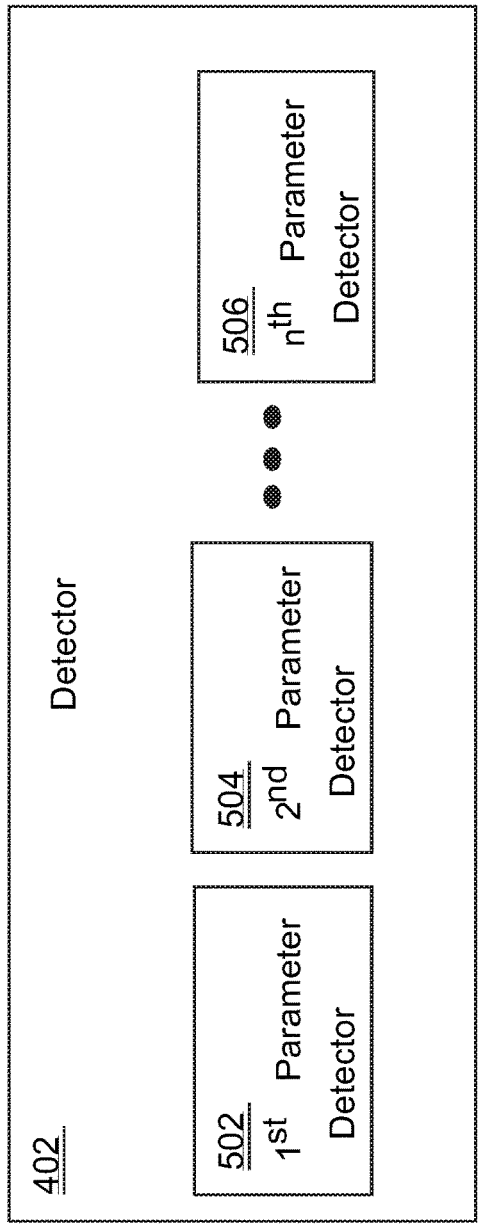
FIG. 5 illustrates an exploded view of the detector of an agent of FIG. 4.

FIG. 5 illustrates an exploded view of detector 402.

As shown in the figure, detector 402 includes a plurality of parameter detectors, a sample of which are indicated as $1^{st}$ parameter detector 502, $2^{nd}$ parameter detector 504 and $n^{th}$ parameter detector 506.

In this example, the plurality of parameter detectors is illustrated as individual devices. However, in some embodiments, at least two of the plurality of parameter detectors may be combined as a unitary device. Further, in some embodiments, at least one of the plurality of parameter detectors may be implemented as a computer having tangible computer-readable media for carrying or having computer-executable instructions or data structures stored thereon.

The parameter detectors may each be a known parameter detector that is able to detect a known parameter. For example each parameter detector may be a known type of detector that is able to detect at least one of electric fields, electro-magnetic fields, position, velocity, acceleration, angular velocity, angular acceleration, geodetic position, sound, temperature, vibrations, pressure, biometrics, contents of surrounding atmosphere, a change in electric fields, a change in electro-magnetic fields, a change in velocity, a change in acceleration, a change in angular velocity, a change in angular acceleration, a change in geodetic position, a change in sound, a change in temperature, a change in vibrations, a change in pressure, a change in biometrics, a change in contents of surrounding atmosphere and combinations thereof. For purposes of discussion, let: $1^{st}$ parameter detector 502 be able to detect the position of agent 106, $p_{106}$; $2^{nd}$ parameter detector 504 be able to detect velocity of agent 106, $v_{106}$; and $n^{th}$ parameter detector 506 be able to detect acceleration of agent 106, $a_{106}$.

In some non-limiting example embodiments, at least one of the parameter detectors of detector 402 may detect a respective parameter as an amplitude at an instant of time. In some non-limiting example embodiments, at least one of the parameter detectors of detector 402 may detect a respective parameter as a function over a period of time.

Each of the parameter detectors of detector 402 is able to generate a respective detected signal based on the detected parameter. Each of these detected signals may be provided to Kalman filter component 606 via communication channel 418, an information of the state of the environment.

Detector 410 of agent 110 operates in a manner similar to detector 402. It should be noted that, while not shown or discussed for brevity, each of agents 108, 112 and 114 have a respective detector that operates in a manner similar to detector 402.

Controller 406 may be any device or system that is operable to instruct agent 106 to perform tasks, as will be described in greater detail below.

Controller 414 of agent 110 operates in a manner similar to controller 406. It should be noted that, while not shown or discussed for brevity, each of agents 108, 112 and 114 have a respective controller that operates in a manner similar to controller 406.

Communication component 404 may be any device or system that is operable to communicate with another agent by known communication methods.

Communication component 412 of agent 110 operates in a manner similar to communication component 404. It should be noted that, while not shown or discussed for brevity, each of agents 108, 112 and 114 have a respective communication component that operates in a manner similar to communication component 404.

Performing component 408 may be any device or system that is operable to perform a predetermined task, a non-limiting example of which includes moving to a position, with a velocity and an acceleration.

Performing component 416 of agent 110 operates in a manner similar to performing component 408. It should be noted that, while not shown or discussed for brevity, each of agents 108, 112 and 114 have a respective performing component that operates in a manner similar to performing component 408.

Communication channels 418, 420, 422, 426, 424 and 428 may be any known type of communication channels, non-limiting examples of which include wired and wireless communication channels.

For purposes of this example, let the parameters being detected for an agent be the position, velocity, and acceleration of the agent. For example, for agent 106 in FIG. 2, the parameters being detected include the position of agent 106, $p_{106}$, the velocity of agent 106, $v_{106}$, the acceleration of agent 106, $a_{106}$. As shown in FIG. 4, these parameters are detected by detector 402.

Returning to FIG. 3, after parameters are detected (S304), agents are detected (S306). For example, for agent 106 in FIG. 2, the position of target 102 is detected. Further, agent 106 also detects and is able to communicate with agents 108, 110 and 112 as these agents are within local detection area 202 of agent 106. As shown in FIG. 4, these targets and agents are detected by detector 402.

Returning to FIG. 3, after agents are detected (S306), parameter signals are transmitted to detected agents (S308).

For example, as shown in FIG. 2, agent 106 transmits parameter signals corresponding to its position, $p_{106}$, its velocity, $v_{106}$, and its acceleration, $a_{106}$, and data of the location of target 102 to agent 108 via communication channel 212, to agent 110 via communication channel 214 and to agent 112 via communication channel 216. Similarly, agent 108 transmits parameter signals corresponding to its position, $p_{108}$, its velocity, $v_{108}$, and its acceleration, $a_{1068}$, and data of the location of target 104 to agent 102 via communication channel 212, to agent 110 via communication channel 218, to agent 112 via communication channel 220, and to agent 114 via communication channel 222. Further, agent 110 transmits parameter signals corresponding to its position, $p_{110}$, its velocity, $v_{110}$, and its acceleration, $a_{110}$, and data of the location of target 104 to agent 106 via communication channel 214 and to agent 108 via communication channel 218. Still further, agent 112 transmits parameter signals corresponding to its position, $p_{112}$, its velocity, $v_{112}$, and its acceleration, $a_{112}$ to agent 106 via communication channel 216, to agent 108 via communication channel 220 and to agent 114 via communication channel 224. Finally, agent 114 transmits parameter signals corresponding to its position, $p_{114}$, its velocity, $v_{114}$, and its acceleration, $a_{114}$, and data of the location of target 104 to agent 108 via communication channel 222 and to agent 112 via communication channel 224.

Returning to FIG. 3, after parameter signals are transmitted to detected agents (S308), parameter signals are received from detected agents (S310). The communication component of a receiving agent communicates with a corresponding communication component of a transmitting agent. For example, as shown in FIG. 4, communication component 412 of agent 110 receives the parameter signals from communication component 404 of agent 106 via communication channel 124.

Returning to FIG. 3, after parameter signals are received from detected agents (S310), it is determined whether the agent is within the reward function (S312). For example, returning to FIG. 2, agent 106 will receive: parameters signals from agent 108 via communication channel 212; parameters signals from agent 110 via communication channel 214; and parameters signals from agent 112 via communication channel 216. Similarly, agent 108 will receive: parameters signals from agent 106 via communication channel 212; parameters signals from agent 110 via communication channel 218; parameters signals from agent 112 via communication channel 220; and parameter signals from agent 114 via communication channel 222. Further, agent 110 will receive: parameters signals from agent 106 via communication channel 214; and parameters signals from agent 108 via communication channel 218. Still further, agent 112 will receive: parameters signals from agent 106 via communication channel 216; parameters signals from agent 108 via communication channel 220; and parameters signals from agent 114 via communication channel 224. Finally, agent 114 will receive: parameters signals from agent 108 via communication channel 222; and parameters signals from agent 112 via communication channel 224.

Further, a controller within each agent will determine whether the current state of the agent is within a reward function. For example, as shown in FIG. 4, controller 406 determines whether agent 106 is within a reward function. This will be described in greater detail below.

Figure 6:
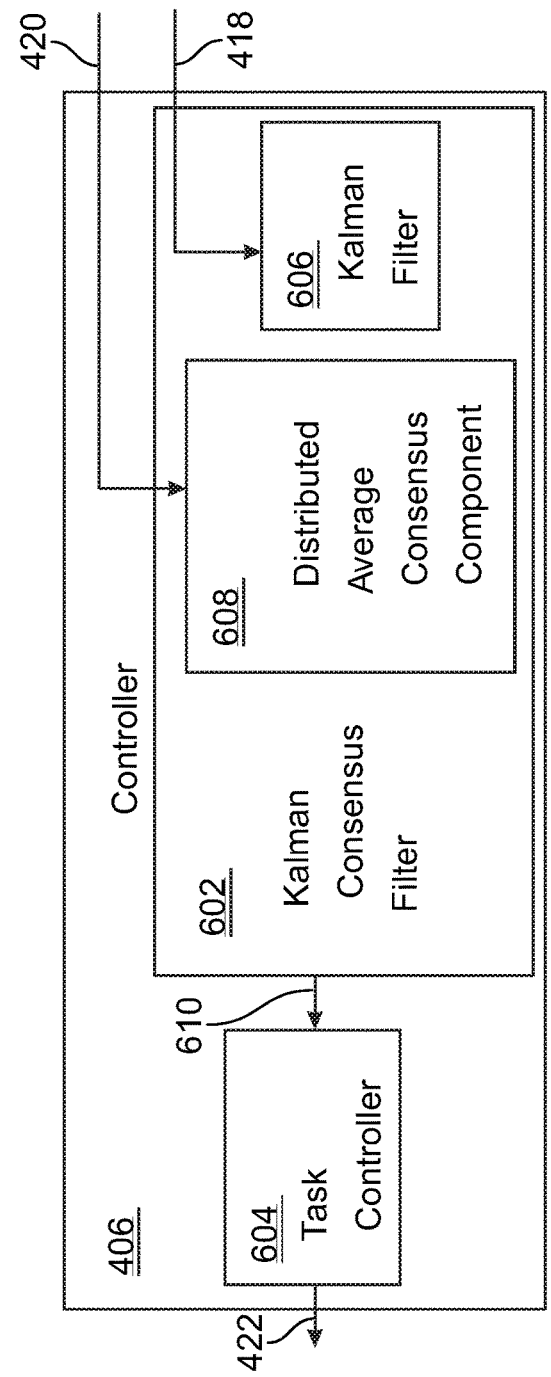
FIG. 6 illustrates an exploded view of the controller of an agent of FIG. 4.

FIG. 6 illustrates an exploded view of controller 406.

As shown in the figure, controller 406 includes a Kalman consensus filter (KCF) 602 and a task controller 604. KCF 602 includes a distributed average consensus (DAC) component 608 and a Kalman filter component 606.

DAC component 608 is arranged to communicate with communication component 404 (not shown) via communication channel 420. Kalman filter component 606 is arranged to communicate with detector 402 via communication channel 418. KCF 602 is arranged to communicate with task controller 604 via a communication channel 610. Task controller 604 is additionally arranged to communicate with performing component 408 (not shown) via communication channel 422.

In this example, KCF 602 and task controller 604 are illustrated as individual devices. However, in some embodiments, KCF 602 and task controller 604 may be combined as a unitary device. Further, in some embodiments, KCF 602 and task controller 604 may be implemented as a computer having tangible computer-readable media for carrying or having computer-executable instructions or data structures stored thereon.

In this example, DAC component 608 and Kalman filter component 606 are illustrated as individual devices. However, in some embodiments, DAC component 608 and Kalman filter component 606 may be combined as a unitary device. Further, in some embodiments, DAC component 608 and Kalman filter component 606 may be implemented as a computer having tangible computer-readable media for carrying or having computer-executable instructions or data structures stored thereon.

KCF 602 may be any device or system that is operable to output a parameter consensus based on parameters data provided by a plurality of agents, wherein the parameter consensus describes a state of the area of operation 100 at a current time, as will be described in more detail below.

Kalman filter component 606 may be any device or system that is operable to generate a local state signal associated with a parameter provided by a single agent, or as detected by agent 106, as will be described in more detail below.

DAC component 608 may be any device or system that is operable to parameter consensus based parameter data received from at least two different agents, as will be described in greater detail below.

Task controller 604 may be any device or system that is operable to generate a task instruction for performing component based on parameters detected by detector and parameters detected by and received from other agents.

In this example, for purposes of discussion only, agents within area of operation 100 do make any determinations at time $t_1$. More specifically, for purposes of discussion, at time $t_1$, is merely detecting parameters and exchanging the data associated with the detected parameters.

FIG. 7 illustrates a table 700 of information related to the environment of area of operation 100 at time $t_1$ as shown in FIG. 2.

As shown in FIG. 7, table 700 includes an agent column 702, a detected parameters column 704, a detected agents/target column 706, a transmits column 708 a receives column 710, a determines column 712, a row 714 for agent 106, a row 716 for agent 108, a row 718 for agent 110, a row 720 for agent 112 and a row 722 for agent 114.

Agent column 702 lists the agents in area of operation 100 at time $t_1$ as shown in FIG. 2.

Detected parameters column 704 indicates what parameters an agent detects. In this example embodiment, the detectable parameters include: the position, $p_i$, of an agent i; the velocity, $v_i$, of agent i; the acceleration, $a_i$, of agent i; and the position, $p_t$, detectable target. For example, the first entry in column 714, row 714 of table 700 is "$p_{108}, v_{108}, a_{108} (t_1)$," which means that the received information includes data of the position of agent 108, $p_{108}$, the velocity of agent 108, $v_{108}$ and the acceleration of agent 108, $a_{108}$, at time $t_1$.

Detected agents/target column 706 indicates which agents and/or targets are detected by each agent, respectively.

Transmits column 708 indicates what information is transmitted by a respective agent. For example, the first entry in column 708, row 714 of table 700 is "$p_{108}, v_{108}, a_{108} (t_1)(*1)$," which means that the received information includes data of the position of agent 108, $p_{108}$, the velocity of agent 108, $v_{108}$ and the acceleration of agent 108, $a_{108}$, at time $t_1$, wherein the information is provided with an identifier of (*1) for ease of future reference.

Receives column 710 indicates: the information that is received by a respective agent; the channel error parameter, $\gamma$, associated with the channel by which a respective agent receives the information; the time, t, the information is received; the detector error parameter, $\delta$, associated with the source of the information; and an identifier, (*n) identifying the information. For example, the first entry in column 710, row 714 of table 700 is "$p_{108}, v_{108}, a_{108} (\delta_{108})(t_1)(\gamma_{212})(*3)$," which means that the received information includes data of the position of agent 108, $p_{108}$, the velocity of agent 108, $v_{108}$ and the acceleration of agent 108, coos, at time $t_1$, wherein the information was received with detector error associated with the detector error parameter of agent 108, $\delta_{108}$, wherein information was additionally received with channel error associated with communication channel 222 from agent 108, $\gamma_{212}$, and wherein the information is provided with an identifier of (*3) for ease of future reference.

It should be noted that many errors may be associated with any system. For purposes of discussion only, a channel error represented by channel error parameter, $\gamma$, and a detector error represented by detector error parameter, $\delta$, are discussed herein. In some cases, error may be known or calculated. In accordance with aspects of the present disclosure, errors, including channel error and detector error, are accounted for with a consensus Kalman filter, whether or not such errors are known.

Determines column 712 indicates what each respective agent determines. For purposes of discussion, in this example, at time $t_1$, each agent may detect parameters, may transmit information and may receive information. However, a determination is performed in a subsequent time, as will be described in further detail below.

Row 714 is for agent 106. As indicated in row 714, column 704, agent 106 detects its own position, $p_{106}$, its own velocity, $v_{106}$, and its acceleration, $a_{106}$, at time $t_1$. Further, agent 106 detects the position, $p_{102}$, of target 102 at time $t_1$.

As indicated in row 714, column 706, agent 106 additionally detects agents 108, 110, 112 and target 102. Returning to FIG. 2, this results from agents 108, 110, 112 and target 102 being within local detection area 202 of agent 106.

Returning to FIG. 7, as indicated in row 714, column 708, agent 106 transmits data indicating its own position, $p_{106}$, its own velocity, $v_{106}$, its acceleration, $a_{106}$, at time $t_1$ and the position, $p_{102}$, of target 102 at time As indicated in row 714, column 710, agent 106 receives data (*3), data (*4), data (*5), data (*6) and data (*7). Data (*3) is the position data of agent 108, $p_{108}$, the velocity data of agent 108, $v_{108}$, and the acceleration data of agent 108, $a_{108}$, as received from agent 108 via communication channel 212 at time $t_1$, and having a detector error parameter $\delta_{108}$.

Communication channel 212 will have a channel error parameter $\gamma_{212}$ associated with transmission errors, including Gaussian noise and channel interference. A detector error parameter, $\delta$, accounts for detector errors of the originating agent, such as for example errors associated with the output of an accelerometer of the originating agent when detecting the acceleration of the originating agent. Detector error parameter $\delta_{108}$ accounts for detector errors in the detectors of agent 108, whereas channel error parameter $\gamma_{212}$ accounts for channel errors in communication channel 212.

As will be described in more detail below, KCF 602 addresses errors that are introduced into the system, which include those errors that are attributed to the communication channel and the detector error parameter $\delta$.

As further indicated in row 714, column 710, data (*4) is the position data of agent 110, $p_{110}$, the velocity data of agent 110, $v_{110}$, and the acceleration data of agent 110, $a_{110}$, as received from agent 110 via communication channel 214 at time $t_1$, and having a channel error parameter $\gamma_{214}$ and a detector error parameter $\delta_{110}$. Detector error parameter $\delta_{110}$ accounts for detector errors in the detectors of agent 110, whereas channel error parameter $\gamma_{214}$ accounts for channel errors in communication channel 214.

Data (*5) is the position data of agent 112, $p_{112}$, the velocity data of agent 112, $v_{112}$, and the acceleration data of agent 112, $a_{112}$, as received from agent 112 via communication channel 216 at time $t_1$, and having a channel error parameter $\gamma_{216}$ and a detector error parameter $\delta_{112}$. Detector error parameter $\delta_{112}$ accounts for detector errors in the detectors of agent 112, whereas channel error parameter $\gamma_{216}$ accounts for channel errors in communication channel 216.

Data (*6) is the position data of target 104, $p_{104}$, as received from agent 108 via communication channel 212, having a channel error parameter $\gamma_{212}$ and detector error parameter $\delta_{108}$. As will be described below, agent 108 detects the position of target 104 because target 104 is within local detection area 204 (please see FIG. 2). Further, as will be described below, agent 108 transmits the position data of detected target 104 to other agents that are within local detection area 204. In this case, agent 106 is within local detection area 204 and thus receives the position data of target 104, $p_{104}$, from agent 108.

Data (*7) is the position data of target 104, $p_{104}$, as received from agent 110 via communication channel 214, having a channel error parameter $\gamma_{214}$ and detector error parameter $\delta_{110}$. In this case, as shown in FIG. 2, agent 106 is within local detection area 206 and thus receives the position data of target 104, $p_{104}$, from agent 110. It should be noted that the position data of target 104, $p_{104}$, as received from agent 108 might differ from the position data of target 104, $p_{104}$, as received from agent 110 because detector error parameter $\delta_{108}$ may differ from detector error parameter $\delta_{110}$ and because channel error parameter $\gamma_{212}$ may differ from channel error parameter $\gamma_{214}$. As will be described in greater detail below, KCF 602 addresses the differences between detector error parameter $\delta_{108}$ may differ from detector error parameter $\delta_{110}$ to establish a consensus of the environment state.

As indicated in row 716, column 704, agent 108 detects its own position, $p_{108}$, its own velocity, $v_{108}$, and its acceleration, $a_{108}$, at time $t_1$. Further, agent 108 detects the position, $p_{104}$, of target 104 at time $t_1$.

As indicated in row 716, column 706, agent 108 additionally detects agents 106, 110, 112, 114 and target 104. Returning to FIG. 2, this results from agents 106, 110, 112, 114 and target 104 being within local detection area 204 of agent 108.

Returning to FIG. 7, as indicated in row 716, column 708, agent 108 transmits data indicating its own position, $p_{108}$, its own velocity, $v_{108}$, its acceleration, $a_{108}$, at time $t_1$, as data (*8), and the position, $p_{104}$, of target 104 at time $t_1$, as data (*9).

As indicated in row 716, column 710, agent 108 receives data (*10), data (*11), data (*12), data (*13), data (*14), data (*15) and data (*16). Data (*10) is the position data of agent 106, $p_{106}$, the velocity data of agent 106, $v_{106}$, and the acceleration data of agent 106, $a_{106}$, as received from agent 106 via communication channel 212 at time $t_1$, having a channel error parameter $\gamma_{212}$ and having detector error parameter $\delta_{106}$. In this example, $\delta_{106}$, accounts for detector errors in the detectors of agent 106. Further, in this example, channel error parameter $\gamma_{212}$ accounts for channel errors in communication channel 212.

Data (*11) is the position data of agent 110, $p_{110}$, the velocity data of agent 110, $v_{110}$, and the acceleration data of agent 110, $a_{110}$, as received from agent 110 via communication channel 218 at time $t_1$, having a channel error parameter $\gamma_{218}$ and having detector error parameter $\delta_{110}$. In this example, channel error parameter $\gamma_{218}$ accounts for channel errors in communication channel 218.

Data (*12) is the position data of agent 112, $p_{112}$, the velocity data of agent 112, $v_{112}$, and the acceleration data of agent 112, $a_{112}$, as received from agent 112 via communication channel 220 at time $t_1$, having a channel error parameter $\gamma_{220}$ and having detector error parameter $\delta_{112}$. In this example, channel error parameter $\gamma_{220}$ accounts for channel errors in communication channel 220.

Data (*13) is the position data of agent 114, $p_{114}$, the velocity data of agent 114, $v_{114}$, and the acceleration data of agent 114, $a_{114}$, as received from agent 114 via communication channel 222 at time $t_1$, having a channel error parameter $\gamma_{222}$ and having a detector error parameter $\delta_{114}$. In this example, $\delta_{114}$, accounts for detector errors in the detectors of agent 114, whereas channel error parameter $\gamma_{222}$ accounts for channel errors in communication channel 222.

Data (*14) is the position data of target 102, $p_{102}$, as received from agent 106 via communication channel 212 with detector error parameter $\delta_{106}$ and with channel error parameter $\gamma_{212}$.

Data (*15) is the position data of target 104, $p_{104}$, as received from agent 110 via communication channel 218 with detector error parameter $\delta_{110}$ and with channel error parameter $\gamma_{218}$.

Data (*16) is the position data of target 104, $p_{104}$, as received from agent 114 via communication channel 222 with detector error parameter $\delta_{114}$ and with channel error parameter $\gamma_{222}$.

As indicated in row 718, column 704, agent 110 detects its own position, $p_{110}$, its own velocity, $v_{110}$, and its acceleration, $a_{110}$, at time $t_1$. Further, agent 110 detects the position, $p_{104}$, of target 104 at time $t_1$.

As indicated in row 718, column 706, agent 110 additionally detects agents 106, 108 and target 104. Returning to FIG. 2, this results from agents 106, 108 and target 104 being within local detection area 206 of agent 110.

Returning to FIG. 7, as indicated in row 718, column 708, agent 110 transmits data indicating its own position, $p_{110}$, its own velocity, $v_{110}$, its acceleration, $a_{110}$, at time $t_1$, as data (*17) and the position, $p_{104}$, of target 104 at time $t_1$, as data (*18).

As indicated in row 718, column 710, agent 110 receives data (*19), data (*20), data (*21) and data (*22). Data (*19) is the position data of agent 106, $p_{106}$, the velocity data of agent 106, $v_{106}$, and the acceleration data of agent 106, $a_{106}$, as received from agent 106 via communication channel 214 at time $t_1$, having a channel error parameter $\gamma_{214}$ and having a detector error parameter $\delta_{106}$. In this example, $\delta_{106}$, accounts for detector errors in the detectors of agent 106.

Data (*20) is the position data of agent 108, $p_{108}$, the velocity data of agent 108, $v_{108}$, and the acceleration data of agent 108, $a_{108}$, as received from agent 110 via communication channel 218 at time $t_1$, having a channel error parameter $\gamma_{218}$ and having detector error parameter $\delta_{108}$.

Data (*21) is the position data of target 102, $p_{102}$, as received from agent 106 via communication channel 214 at time $t_1$, having a channel error parameter $\gamma_{214}$ and having detector error parameter $\delta_{106}$.

Data (*22) is the position data of target 104, $p_{104}$, as received from agent 108 via communication channel 218 at time $t_1$, having an channel error parameter $\gamma_{218}$ and having detector error parameter $\delta_{108}$.

As indicated in row 720, column 704, agent 112 detects its own position, $p_{112}$, its own velocity, $v_{112}$, and its acceleration, $a_{112}$, at time $t_1$.

As indicated in row 720, column 706, agent 112 additionally detects agents 106, 108 and 114. Returning to FIG. 2, this results from agents 106, 108 and 114 being within local detection area 208 of agent 112.

Returning to FIG. 7, as indicated in row 720, column 708, agent 112 transmits data indicating its own position, $p_{112}$, its own velocity, $v_{112}$, its acceleration, $a_{112}$, at time $t_1$ and the position, $p_{112}$, of target 104 at time $t_1$, as data (*23).

As indicated in row 720, column 710, agent 112 receives data (*24), data (*25), data (*26), data (*27), data (*28) and data (*22). Data (*24) is the position data of agent 106, $p_{106}$, the velocity data of agent 106, $v_{106}$, and the acceleration data of agent 106, $a_{106}$, as received from agent 106 via communication channel 216 at time $t_1$, having an channel error parameter $\gamma_{216}$ and having detector error parameter $\delta_{106}$.

Data (*25) is the position data of agent 108, $p_{108}$, the velocity data of agent 108, $v_{108}$, and the acceleration data of agent 108, $a_{108}$, as received from agent 108 via communication channel 220 at time $t_1$, having an channel error parameter $\gamma_{220}$ and having detector error parameter $\delta_{108}$.

Data (*26) is the position data of agent 114, $p_{114}$, the velocity data of agent 114, $v_{114}$, and the acceleration data of agent 114, $a_{114}$, as received from agent 114 via communication channel 224 at time $t_1$, having an channel error parameter $\gamma_{224}$ and having detector error parameter $\delta_{114}$.

Data (*27) is the position data of target 102, $p_{102}$, as received from agent 106 via communication channel 216 at time $t_1$, having an channel error parameter $\gamma_{216}$ and having detector error parameter $\delta_{106}$.

Data (*28) is the position data of target 104, $p_{104}$, as received from agent 108 via communication channel 220 at time $t_1$, having an channel error parameter $\gamma_{220}$ and having detector error parameter $\delta_{108}$.

Data (*29) is the position data of target 104, $p_{104}$, as received from agent 114 via communication channel 224 at time $t_1$, having an channel error parameter $\gamma_{224}$ and having detector error parameter $\delta_{114}$.

As indicated in row 722, column 704, agent 114 detects its own position, $p_{114}$, its own velocity, $v_{114}$, and its acceleration, $a_{114}$, at time $t_1$. Further, agent 114 detects the position, $p_{104}$, of target 104 at time $t_1$.

As indicated in row 722, column 706, agent 114 additionally detects agents 108 and 112 and target 104. Returning to FIG. 2, this results from agents 108 and 112 and target 104 being within local detection area 210 of agent 114.

Returning to FIG. 7, as indicated in row 722, column 708, agent 114 transmits data indicating its own position, $p_{114}$, its own velocity, $v_{114}$, its acceleration, $a_{114}$, at time $t_1$, as data (*30) and the position, $p_{104}$, of target 104 at time $t_1$, as data (*31).

As indicated in row 720, column 710, agent 114 receives data (*32), data (*33) and data (*25). Data (*32) is the position data of agent 108, $p_{108}$, the velocity data of agent 108, $v_{108}$, and the acceleration data of agent 108, $a_{108}$, as received from agent 108 via communication channel 222 at time $t_1$, having an channel error parameter $\gamma_{222}$ and having detector error parameter $\delta_{108}$.

Data (*33) is the position data of agent 112, $p_{112}$, the velocity data of agent 112, $v_{112}$, and the acceleration data of agent 112, $a_{112}$, as received from agent 112 via communication channel 224 at time $t_1$, having an channel error parameter $\gamma_{224}$ and having detector error parameter $\delta_{108}$.

Data (*34) is the position data of target 104, $p_{104}$, as received from agent 108 via communication channel 222 at time $t_1$, having an channel error parameter $\gamma_{222}$ and having detector error parameter $\delta_{108}$.

Please consider the following items of note with respect to table 700 of FIG. 7.

Among the data received by agent 106, it receives position data (*6 and *7) of target 104 from two different agents. These two different data of the position of target 104 will be address by KCF 602 at time $t_2$, as will be described in greater detail below.

Similarly, among the data received by agent 108, it receives position data (*15 and *16) of target 104 from two different agents. These two different data of the position of target 104 will be address by the KCF (not shown) of agent 108 at time $t_2$.

Further, among the data received by agent 112, it receives position data (*28 and *29) of target 104 from two different agents. These two different data of the position of target 104 will be address by the KCF (not shown) of agent 112 at time $t_2$.

With respect to the operation of a controller of an agent, the operation of controller 406 will be described as an example with reference to FIGS. 8-10.

FIG. 8 illustrates a graph 800 of the output of Kalman filter component 606 related to the position of target 104 using data from agent 108. Again, as mentioned above, with reference to column 710, row 714 of table 700 of FIG. 7, data (*6) corresponds to the position of target 104 as received by agent 108 via channel 212. Accordingly, data (*6) has channel error parameter $\gamma_{212}$ and detector error parameter $\delta_{108}$.

As shown in the figure, graph 800 includes a y-axis 802, an x-axis 804, a plurality of data points 806, 808, 810, 812 and 814 and a function 816. Graph 800 is provided for discussion purpose, wherein y-axis 802 corresponds to a position on some predetermined axis from a predetermined origin and x-axis 804 corresponds to the time a position of target 104 is detected by agent 108.

Kalman filter component 606 keeps track of the estimated position of target 104 using data provided by agent 108 and the various uncertainty of the estimate from agent 108. As data point 806 is the first data point, it has the largest uncertainty, which is represented by data point 806 being the largest circle. The uncertainty of the estimate from agent 108 decreases over time as a result of processing by the Kalman filter component 606, which is represented by the size of data points 808, 810, 812 and 814 decreasing over time. The estimate is updated based on previous estimated positions of target 104 from agent 108. Accordingly, each step in time provided a more accurate estimate of the actual position of target 104 from agent 108. Function 816 is merely provided to show a general relationship of the estimated position of target 104 as a function of time.

As mentioned, graph 800 is provided merely for discussion purposes. Kalman filter component 606 uses input for any detected parameter to determine the state of the detected environment. As such, in the example embodiment for the system discussed with reference to FIG. 1, the parameters that Kalman filter component 606 may potentially process include the position, velocity and acceleration of all agents and the positions of each target.

FIG. 9 illustrates a graph 900 of the output of Kalman filter component 606 related to the position of target 104 using data from agent 110. Again, as mentioned above, with reference to column 710, row 714 of table 700 of FIG. 7, data (*7) corresponds to the position of target 104 as received by agent 110 via channel 214. Accordingly, data (*7) has channel error parameter $\gamma_{214}$ and detector error parameter $\delta_{110}$.

As shown in the figure, graph 900 includes a y-axis 902, an x-axis 904, plurality of data points 806, 808, 810, 812 and 814 (each provided as a dotted line), function 816 (provided as a dotted line), a plurality of data points 906, 908, 910, 912 and 914, a function 916.

Kalman filter component 606 keeps track of the estimated position of target 104 using data provided by agent 110 and the various uncertainty of the estimate from agent 110. As data point 906 is the first data point, it has the largest uncertainty, which is represented by data point 906 being the largest circle. The uncertainty of the estimate from agent 110 decreases over time as a result of processing by the Kalman filter component 606, which is represented by the size of data points 908, 910, 912 and 914 decreasing over time. The estimate is updated based on previous estimated positions of target 104 from agent 110. Accordingly, each step in time provided a more accurate estimate of the actual position of target 104 from agent 110. Function 916 is merely provided to show a general relationship of the estimated position of target 104 as a function of time.

As shown in graph 900, the estimated position of target 104 using data provided by agent 108 as illustrated by function 816 is slightly different from the estimated position of target 104 using data provided from agent 110 as illustrated by function 916. These differences are the result of the differences between channel error parameters and detector error parameters of the data. From the perspective of agent 106, it might not be clear which of the two distinct position estimates of target 104, one from agent 108 as represented by function 816 and one from agent 110 as represented by function 916, more accurately reflects the actual position of target 104. KCF 602 addresses this issue, as will be discussed with additional reference to FIG. 10.

Figure 10:
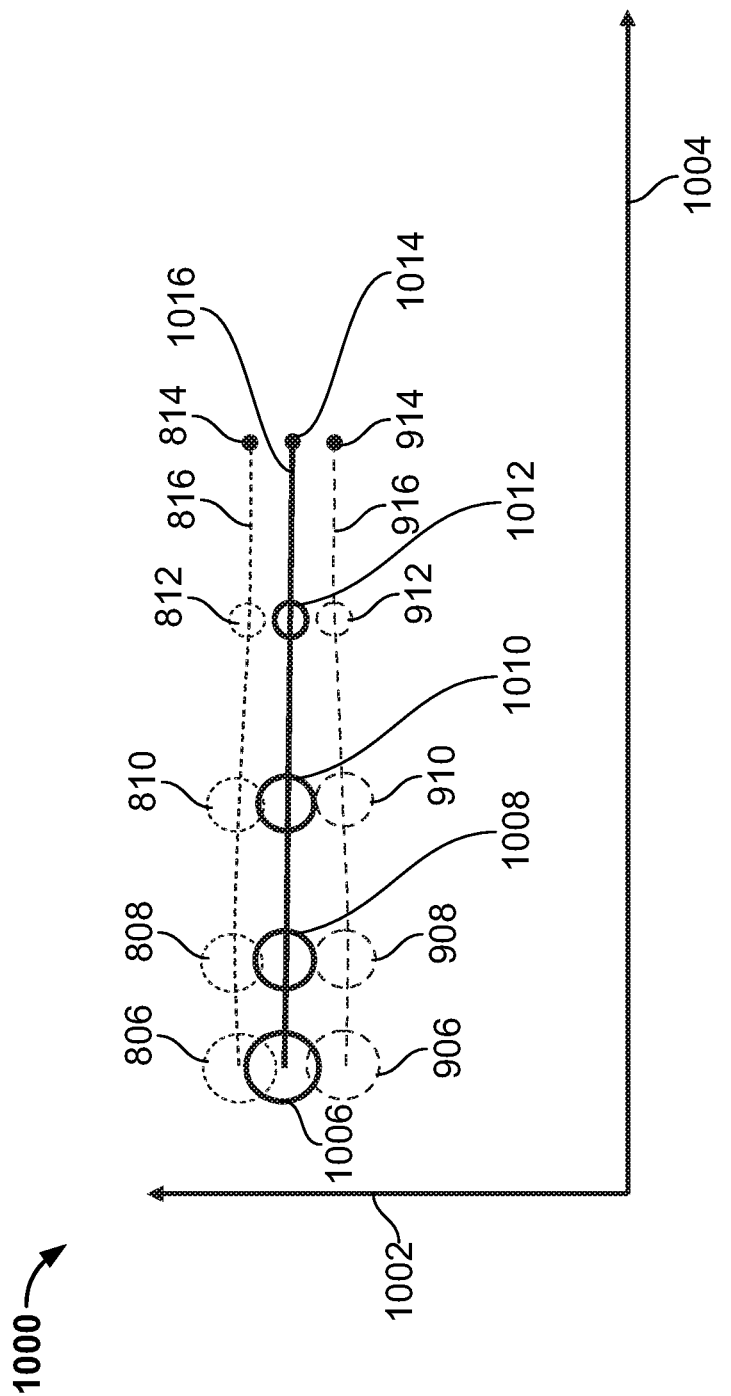
FIG. 10 illustrates an example output of a Kalman consensus filter of the controller of FIG. 6.

FIG. 10 illustrates a graph 1000 of the output of KCF 602 related to the position of target 104 using data from agent 110 and data from agent 112.

As shown in the figure, graph 1000 includes a y-axis 1002, an x-axis 1004, plurality of data points 806, 808, 810, 812 and 814 (each provided as a dotted line), function 816 (provided as a dotted line), plurality of data points 906, 908, 910, 912 and 914 (each provided as a dashed line), function 916 (provided as a dashed line), a plurality of data points 1006, 1008, 1010, 1012 and 1014, a function 1016.

Returning to FIG. 6, DAC component 608 receives data of the position of target 104 that was received from agent 108 via communication channel 420 and receives data of the position of target 104 that was received from agent 110 via communication channel 420. DAC component 608 receives determines the estimated position of target 104 using data provided by agent 108 and data provided from agent 110.

In an example embodiment, DAC component 608 averages data of the position of target 104 that was received from agent 108 data of the position of target 104 that was received from agent 110 to determine the estimated position of target 104. Such an average would be average consensus derived from the distributed agents 108 and 110.

In other example embodiments, DAC component 608 uses predetermined weighting factors. In particular, a respective weighting factor to be multiplied by a received data may be based on many predetermined factors.

In some embodiments, a predetermined weighting factor may be based on the number instances that a parameter is measured. For example, if agent 108 were to provide more instances of a measured position of target 104 as compared to the number of instances that agent 110 may provide the measured position of target 104, then the predetermined weighting factor for agent 108 may be larger than the predetermined weighting factor for agent 110.

In some embodiments, a predetermined weighting factor may be based on the distance from which a parameter is measured. For example, if agent 108 were further from the measured position of target 104 as compared to the distance between agent 110 and the measured position of target 104, then the predetermined weighting factor for agent 108 may be smaller than the predetermined weighting factor for agent 110.

In some embodiments, a predetermined weighting factor may be based on the agents themselves. For example, if agent 108 has a position measuring device that is lesser quality or precision as compared to the position measuring device of agent 110, then the predetermined weighting factor for agent 108 may be smaller than the predetermined weighting factor for agent 110.

Returning to FIG. 10, again, from the perspective of agent 106, it might not be clear which of the two distinct position estimates of target 104, one from agent 108 as represented by function 816 and one from agent 110 as represented by function 916, more accurately reflects the actual position of target 104. Accordingly, in accordance with aspects of the present disclosure KCF 602 creates a consensus of the data provided by agent 108 and the data provided by agent 110.

In particular, in this example, KCF 602 uses data associated with data point 806 from agent 108 and data associated with data point 906 from agent 110 to estimate the position of target 104 as indicated by data point 1006, which in this case lies between data point 806 and data point 906. Similarly, KCF 602 uses: data associated with data point 808 from agent 108 and data associated with data point 908 from agent 110 to estimate the position of target 104 as indicated by data point 1008, which in this case lies between data point 808 and data point 908; data associated with data point 810 from agent 108 and data associated with data point 910 from agent 110 to estimate the position of target 104 as indicated by data point 1010, which in this case lies between data point 810 and data point 910; data associated with data point 812 from agent 108 and data associated with data point 912 from agent 110 to estimate the position of target 104 as indicated by data point 1012, which in this case lies between data point 812 and data point 912; and data associated with data point 814 from agent 108 and data associated with data point 914 from agent 110 to estimate the position of target 104 as indicated by data point 1014, which in this case lies between data point 814 and data point 914.

The estimated position of target 104 from KCF 602 is illustrated by function 1016, which lies between the estimated position of target 104 using data provided from agent 108 as illustrated by function 816 and the estimated position of target 104 using data provided from agent 110 as illustrated by function 916.

Returning to FIG. 4, after detector 402 detects the parameters they are provided to controller 406 via communication channel 418. Further, after communication component 404 receives parameter signals from agent 110 (and other agents, not shown), these are additionally provided to controller 406 via communication channel 420. With the detected and received parameter signals, controller determines what next task should be performed by agent 106. This will be described in greater detail with reference to FIG. 11.

Figure 11:
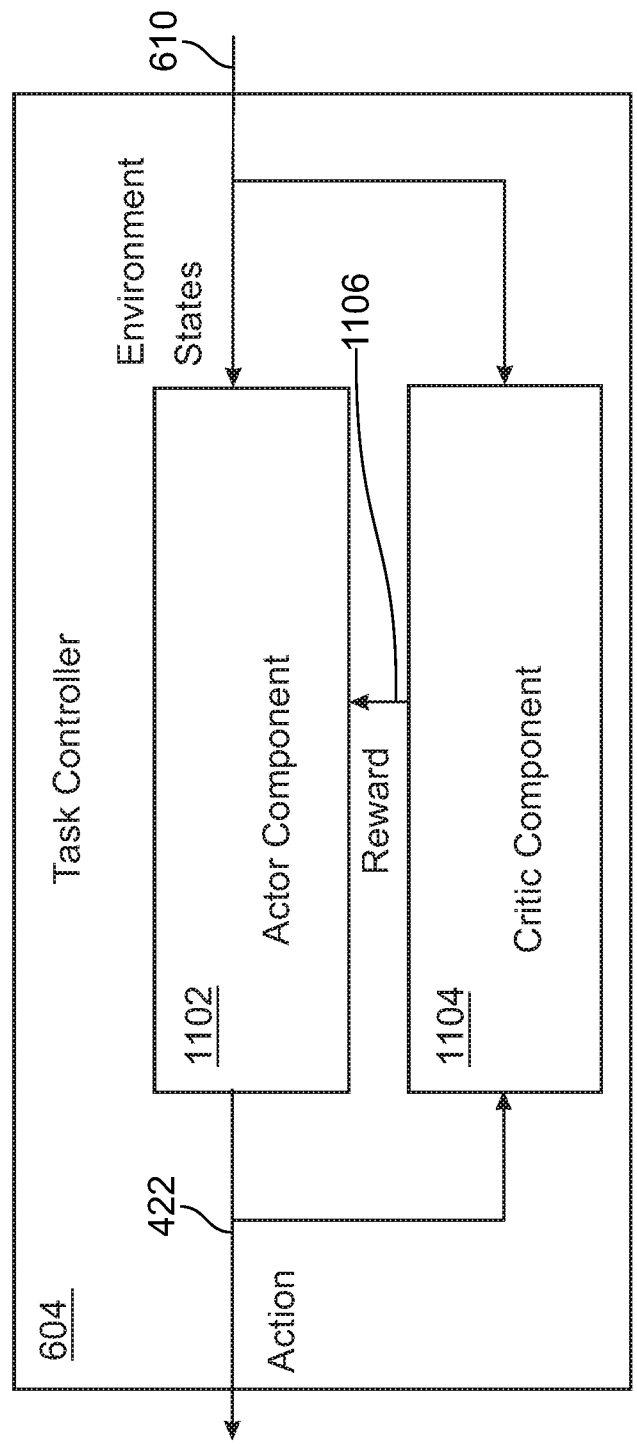
FIG. 11 illustrates an exploded view of the task controller of the controller of FIG. 6.

FIG. 11 illustrates an exploded view of task controller 604.

As shown in the figure, task controller 604 includes an actor component 1102 and a critic component 1104.

Actor component 1102 is arranged to communicate with KCF 602 (not shown) via communication channel 610, to communicate with critic component 1104 via communication channel 422, to communicate with critic component via a communication channel 1106 and to communicate with performing component (not shown) via communication channel 422. Critic component is additionally arranged to communicate with KCF 602 (not shown) via communication channel 610.

In this example, actor component 1102 and critic component 1104 are illustrated as individual devices. However, in some embodiments, actor component 1102 and critic component 1104 may be combined as a unitary device. Further, in some embodiments, at least one of actor component 1102 and critic component 1104 may be implemented as a computer having tangible computer-readable media for carrying or having computer-executable instructions or data structures stored thereon.

Actor component 1102 takes in the current environment state from KCF 602 via communication channel 610 and determines the best action for agent 106 to take to accomplish the predetermined task so as to reach a goal state. In this example, the current environment includes the position, velocity and acceleration of all agents and the position of each target within area of operation 100. The determined action is output as a task instruction on communication channel 422. In this example, a task instruction may take the form of an instruction for performing component 408 to move agent 106 to a new position (for example, as will be discussed below with reference to FIG. 12), with a specific velocity and a specific acceleration.

Critic component 1104 plays the evaluation role by taking in the current environment state from KCF 602 via communication channel 610 and the outputs a score, based on a predetermined reward function, which represents how good the task instruction is based on the current environment state. The score is output to actor component 1102 via communication channel 1106. The scores provided by critic component 1104, over time, train actor component 1102 in order to eventually have all agents arrive at the goal state.

Returning to FIG. 3, if it is determined that the device is not within the reward function (No at S312), then the state of the device changes (S314). For example, returning to FIG. 11, actor component 1102 may generate task instruction for performing component 408 (not shown).

Figure 12:
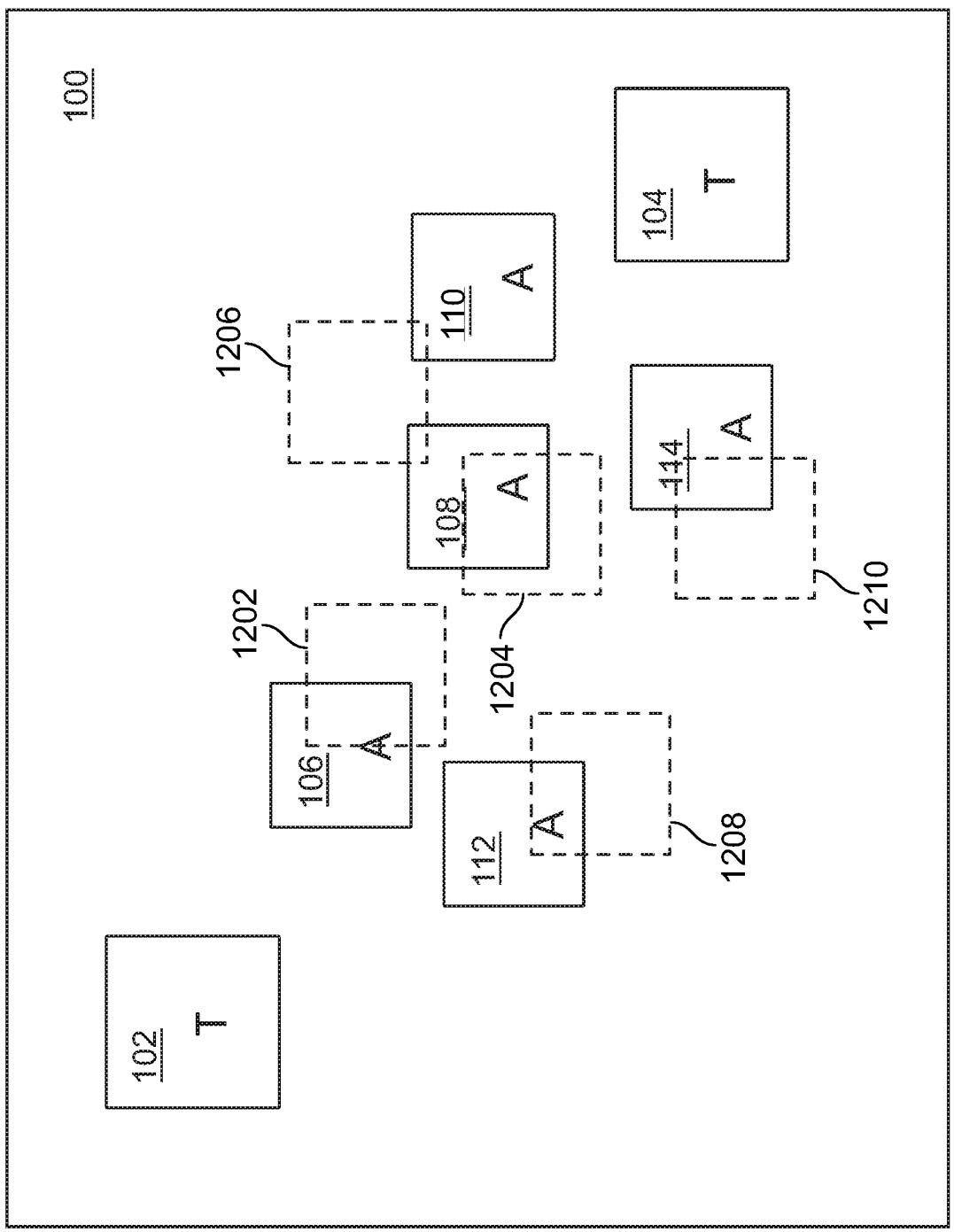
FIG. 12 illustrates the area of operation of FIG. 1, having autonomous agents and targets dispersed therein, at a time $t_2$.

For purposes of discussion, let actor component 1102 generate a task instruction such that performing component 408 will move agent 106 to a new position, as indicated in FIG. 12 and discussed further below. Similarly, for purposes of discussion, let the respective actor components of the remainder of the agents (not shown) generate similar task instructions.

Returning to FIG. 3, after the state of the device changes (S314), parameters are again detected (return to S312) and method 300 continues FIG. 12 illustrates area of operation 100 having autonomous agents and targets dispersed therein, at a time $t_2$. For purposes of comparison, the position of each agent at time $t_1$ as shown in FIG. 2 is illustrated with a dotted box. In particular, at time $t_1$ as shown in FIG. 2, agent 106 was in the location illustrated by dotted box 1202, agent 108 was in the location illustrated by dotted box 1204, agent 110 was in the location illustrated by dotted box 1206, agent 112 was in the location illustrated by dotted box 1208 and agent 114 was in the location illustrated by dotted box 1210.

Figure 13:
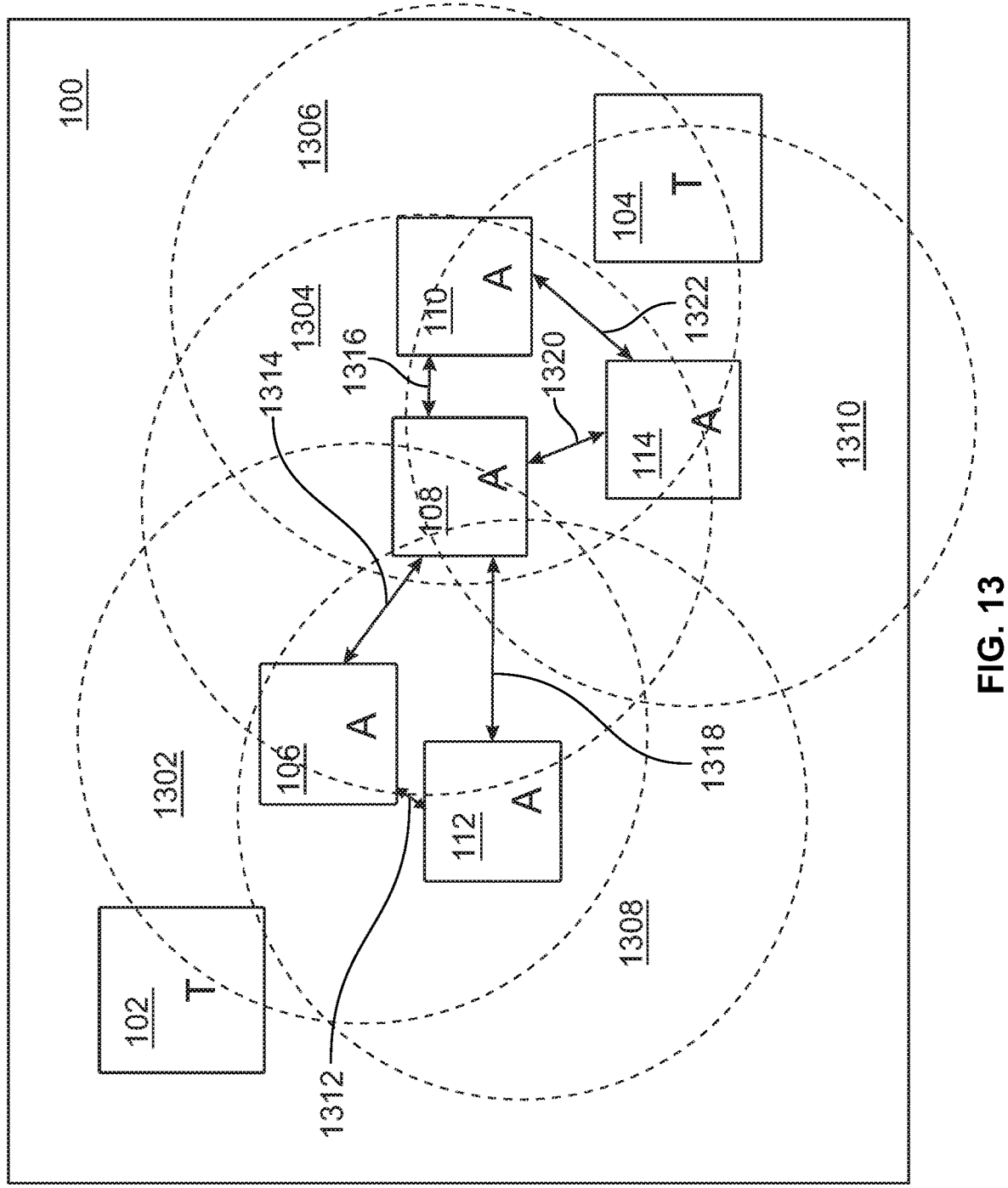
FIG. 13 illustrates the area of operation of FIG. 12, at time $t_2$, with local areas and communication channels associated with the autonomous agents.

FIG. 13 illustrates the area of operation of FIG. 12, at time $t_2$, with local areas and communication channels associated with the autonomous agents.

As shown in FIG. 13, agent 106 has a local detection area 1302, agent 108 has a local detection area 1304, agent 110 has a local detection area 1306, agent 112 has a local detection area 1308 and agent 114 has a local detection area 1310.

Agent 106 is positioned such that agent 108 and agent 110 are in local detection area 1002. Agent 108 is positioned such that agent 106, agent 110, agent 112, agent 114 and target 104 are in local detection area 1304. Agent 110 is positioned such that agent 108, agent 114 and target 104 are in local detection area 1306. Agent 112 is positioned such that agent 106, agent 108 and target 102 are in local detection area 1308. Agent 114 is positioned such that agent 108, agent 110 and target 104 are in local detection area 1310.

Agent 106 is operable to bi-directionally communicate with agent 108 via a communication channel 1314 and to bi-directionally communicate with agent 112 via a communication channel 1312. Agent 108 is additionally operable to bi-directionally communicate with agent 110 via a communication channel 1316, to bi-directionally communicate with agent 112 via a communication channel 1318 and to bi-directionally communicate with agent 114 via a communication channel 1320. Agent 110 is additionally operable to bi-directionally communicate with agent 114 via a communication channel 1322.

FIGS. 14A-B illustrate a table of information 1400 related to the environment of area of operation 100 at time $t_2$ as shown in FIG. 13.

As shown in FIGS. 14A-B, table 1400 includes an agent column 1402, a detected parameters column 1404, a detected agents/target column 1406, a transmits column 1408 a receives column 1410 a determines column 1412, a row 1414 for agent 106, a row 1416 for agent 108, a row 1418 for agent 110, a row 1420 for agent 112 and a row 1422 for agent 114. FIG. 14A includes rows 1414, 1416 and 1418, whereas FIG. 14B continues with rows 1420 and 1422.

The columns of FIGS. 14A-B are similar to the columns of FIG. 7 discussed above, but are drawn to area of operation 100 at time $t_2$ as shown in FIG. 13.

As shown in FIG. 14A, row 1414 is for agent 106. As indicated in row 1414, column 1404, agent 106 detects its own position, $p_{106}$, its own velocity, $v_{106}$, and its acceleration, $a_{106}$, at time $t_2$. Further, agent 106 detects the position, $p_{102}$, of target 102 at time $t_2$.

As indicated in row 1414, column 1406, agent 106 detects agents 108, 112 and target 102. Returning to FIG. 13, this results from agents 108, 112 and target 102 being within local detection area 1302 of agent 106.

Returning to FIG. 14A, as indicated in row 1414, column 1408, agent 106 transmits: data indicating its own position, $p_{106}$, its own velocity, $v_{106}$, its acceleration, $a_{106}$, at time $t_2$, as data (*35); and data indicating the position of target 102, $p_{102}$, at time $t_2$, as data (*36). Further, agent 106 transmits data (*3)-(*7), which agent 106 had previously received at time $t_1$, as discussed above with reference to FIG. 7. This daisy-chaining of data (*3)-(*7) will assist other agents in determining the environment state of area of operation 100.

As indicated in row 1414, column 1410, agent 106 receives data (*37), data (*38), data (*39), data (*40) and data (*41). Data (*37) is the position data of agent 108, $p_{108}$, the velocity data of agent 108, $v_{108}$, and the acceleration data of agent 108, $a_{108}$, as received from agent 108 via communication channel 1314 at time $t_2$, having a channel error parameter $\gamma_{1314}$ and having detector error parameter $\delta_{108}$.

Data (*38) is the position data of agent 112, $p_{112}$, the velocity data of agent 112, $v_{112}$, and the acceleration data of agent 112, $a_{112}$, as received from agent 112 via communication channel 1312 at time $t_2$, having a channel error parameter $\gamma_{1312}$ and having detector error parameter $\delta_{112}$.

Data (*39) is the position data of target 102, $p_{102}$, as received from agent 112 via communication channel 1312, having channel error parameter $\gamma_{1312}$ and detector error parameter $\delta_{112}$.

Data (*40) is the combination of data (*10)-(*16), as received from agent 108 via communication channel 1314. Data (*40) is therefore, returning to FIG. 7, the data discussed above in column 710, row 716 of table 700. In other words, agent 108 is daisy chaining the data collected from time $t_1$ to agent 106 at time $t_2$. As will be described in more detail below, data (*40) will be used by KCF 602 of agent 106 to update the state of area of operation 100.

It should be noted that data (*40) will have stacked errors associated with the communication channels. In particular, as discussed above and shown in FIG. 7: data (*10) and data (*14) were received by agent 108 at time $t_1$ via communication channel 212, and will thus have a corresponding error; data (*11) and data (*15) were received by agent 108 at time $t_1$ via communication channel 218, and will thus have a corresponding error; data (*12) was received by agent 108 at time $t_1$ via communication channel 220, and will thus have an associated error; and data (*13) and data (*16) were received by agent 108 at time $t_1$ via communication channel 222, and will thus have an associated error. Each of these data will additionally have channel error parameter $\gamma_{1314}$ associated with communication channel 1314 when transmitted as data (*40) from agent 108 to agent 106.

Data (*41) is the combination of data (*24)-(*29), as received from agent 112 via communication channel 1312. Data (*41) is therefore, returning to FIG. 7, the data discussed above in column 710, row 720 of table 700. In other words, agent 112 is daisy chaining the data collected from time $t_1$ to agent 106 at time $t_2$. As will be described in more detail below, data (*41) will be used by KCF 602 of agent 106 to update the state of area of operation 100.

Similar to data (*40) discussed above, data (*41) will have stacked errors associated with the communication channels. In particular, as discussed above and shown in FIG. 7: data (*24) and data (*27) were received by agent 112 at time $t_1$ via communication channel 216, and will thus have a corresponding error; data (*25) and data (*28) were received by agent 112 at time $t_1$ via communication channel 220, and will thus have a corresponding error; and data (*26) and data (*29) were received by agent 112 at time $t_1$ via communication channel 224, and will thus have an associated error. Each of these data will additionally have channel error parameter $\gamma_{1312}$ associated with communication channel 1312 when transmitted as data (*41) from agent 112 to agent 106.

Column 1412 indicates the information that is determined by a respective agent. It should be noted that the information that is determined at time $t_n$, is based on information that is received by the agent at a previous time $t_{n-1}$. For example, the first entry in column 1412, row 1414 of table 1400 is "$S_{106}$(*1)," which means that agent 106 determines the state of agent 106, $S_{106}$, based on the data (*1), which is identified in column 708, row 714, of table 700 of FIG. 7. In particular, data (*1) was detected by agent 106 at time $t_1$.

As further indicated in row 1414, column 1412, agent 106 additionally determines: the state of agent 108, $S_{108}$, based on data (*3); the state of agent 110, $S_{110}$, based on data (*4); the state of agent 112, $S_{112}$, based on data (*5); the state of target 102, $S_{102}$, based on data (*2); and the state of target 104, $S_{104}$, based on data (*6) and data (*7), which agent 106 had previously received at time $t_1$, as discussed above with reference to FIG. 7.

With respect to determining the state of target 104, $S_{104}$, please return to column 710, row 714 of FIG. 7. Data (*6) corresponds to a measured position of target 104 by agent 108. Data (*6) is received by agent 106 from agent 108 via communication channel 212, having a channel error parameter $\gamma_{212}$ and having detector error parameter $\delta_{108}$. On the other hand, data (*7) corresponds to a measured position of target 104 by agent 110 via communication channel 214, having a channel error parameter $\gamma_{214}$ and having detector error parameter $\delta_{110}$. It should be noted that the position of target 104 as measured by agent 108 may differ from the position of target 104 as measured by agent 110. Further, data (*7) is received by agent 106 from agent 110 via communication channel 214. It should be noted that communication channel 212 may have different errors as compared to communication channel 214. As will be described in more detail below, KCF 602 of controller 406 of agent 106 is able to take into account these differences in data and communication channel errors to establish a consensus position of target 104.

Returning to FIG. 14A, row 1416 is for agent 108. As indicated in row 1416, column 1404, agent 108 detects its own position, $p_{108}$, its own velocity, $v_{108}$, and its acceleration, $a_{108}$, at time $t_2$.

As indicated in row 1416, column 1406, agent 108 additionally detects agents 106, 110, 112 and 114. Returning to FIG. 13, this results from agents 106, 110, 112 and 114 being within local detection area 1304 of agent 108.

Returning to FIG. 14A, as indicated in row 1416, column 1408, agent 108 transmits data indicating its own position, $p_{108}$, its own velocity, $v_{108}$, its acceleration, $a_{108}$, at time $t_2$, as data (*42), and transmits data (*10)-(*16), which agent 108 had previously received at time $t_1$, as discussed above with reference to FIG. 7.

As indicated in row 1416, column 1410, agent 108 receives data (*43), data (*44), data (*45), data (*46), data (*47), data (*48), data (*49), data (*50), data (*51), data (*52), data (*53) and data (*54).

Data (*43) is the position data of agent 106, $p_{106}$, the velocity data of agent 106, $v_{106}$, and the acceleration data of agent 106, $a_{106}$, as received from agent 106 via communication channel 1314 at time $t_2$, having channel error parameter $\gamma_{1314}$ and having detector error parameter $\delta_{106}$.

Data (*44) is the position data of agent 110, $p_{110}$, the velocity data of agent 110, $v_{110}$, and the acceleration data of agent 110, $a_{110}$, as received from agent 110 via communication channel 1316 at time $t_2$, having channel error parameter $\gamma_{1316}$ and having detector error parameter $\delta_{110}$.

Data (*45) is the position data of agent 112, $p_{112}$, the velocity data of agent 112, $v_{112}$, and the acceleration data of agent 112, $a_{112}$, as received from agent 112 via communication channel 1318 at time $t_2$, having a channel error parameter $\gamma_{1318}$ and having detector error parameter $\delta_{112}$.

Data (*46) is the position data of agent 114, $p_{114}$, the velocity data of agent 114, $v_{114}$, and the acceleration data of agent 114, $a_{114}$, as received from agent 114 via communication channel 1320 at time $t_2$, having a channel error parameter $\gamma_{1320}$ and having detector error parameter $\delta_{114}$.

Data (*47) is the position data of target 102, $p_{102}$, as received from agent 106 via communication channel 1314, having channel error parameter $\gamma_{1314}$ and having detector error parameter $\delta_{106}$.

Data (*48) is the position data of target 104, $p_{104}$, as received from agent 110 via communication channel 1316, having channel error parameter $\gamma_{1316}$ and having detector error parameter $\delta_{110}$.

Data (*49) is the position data of target 102, $p_{102}$, as received from agent 110 via communication channel 1318, having channel error parameter $\gamma_{1318}$ and having detector error parameter $\delta_{110}$.

Data (*50) is the position data of target 104, $p_{104}$, as received from agent 114 via communication channel 1320, having channel error parameter $\gamma_{1320}$ and having detector error parameter $\delta_{114}$.

Data (*51) is the combination of data (*3)-(*7), as received from agent 106 via communication channel 1314. Data (*51) is therefore, returning to FIG. 7, the data discussed above in column 710, row 714 of table 700. In other words, agent 106 is daisy chaining the data collected from time $t_1$ to agent 108 at time $t_2$. As will be described in more detail below, data (*51) will be used by a Kalman consensus filter (not shown) of agent 108 to update the state of area of operation 100.

As discussed above with reference to data (*41), data (*51) will have stacked errors associated with the communication channels. In particular, as discussed above and shown in FIG. 7: data (*3) and data (*6) were received by agent 106 at time $t_1$ via communication channel 212, and will thus have a corresponding error; data (*4) and data (*7) were received by agent 106 at time $t_1$ via communication channel 214, and will thus have a corresponding error; and data (*5) was received by agent 106 at time $t_1$ via communication channel 216, and will thus have an associated error. Each of these data will additionally have channel error parameter $\gamma_{1314}$ associated with communication channel 1314 when transmitted as data (*51) from agent 106 to agent 108.

Data (*52) is the combination of data (*19)-(*22), as received from agent 110 via communication channel 1316. Data (*52) is therefore, returning to FIG. 7, the data discussed above in column 710, row 718 of table 700. In other words, agent 110 is daisy chaining the data collected from time $t_1$ to agent 108 at time $t_2$. As will be described in more detail below, data (*52) will be used by a Kalman consensus filter (not shown) of agent 108 to update the state of area of operation 100.

Similar to data (*51) discussed above, data (*52) will have stacked errors associated with the communication channels. In particular, as discussed above and shown in FIG. 7: data (*19) and data (*21) were received by agent 110 at time $t_1$ via communication channel 214, and will thus have a corresponding error; and data (*20) and data (*22) were received by agent 110 at time $t_1$ via communication channel 218, and will thus have a corresponding error. Each of these data will additionally have channel error parameter $\gamma_{1316}$ associated with communication channel 1316 when transmitted as data (*52) from agent 110 to agent 108.

Data (*53) is the combination of data (*24)-(*29), as received from agent 112 via communication channel 1318. Data (*53) is therefore, returning to FIG. 7, the data discussed above in column 710, row 720 of table 700. In other words, agent 112 is daisy chaining the data collected from time $t_1$ to agent 108 at time $t_2$. As will be described in more detail below, data (*53) will be used by a Kalman consensus filter (not shown) of agent 108 to update the state of area of operation 100.

Similar to data (*52) discussed above, data (*53) will have stacked errors associated with the communication channels. In particular, as discussed above and shown in FIG. 7: data (*24) and data (*27) were received by agent 112 at time $t_1$ via communication channel 216, and will thus have a corresponding error; data (*25) and data (*28) were received by agent 112 at time $t_1$ via communication channel 220, and will thus have a corresponding error; and data (*26) and data (*29) were received by agent 112 at time $t_1$ via communication channel 224, and will thus have a corresponding error. Each of these data will additionally have channel error parameter $\gamma_{1318}$ associated with communication channel 1318 when transmitted as data (*53) from agent 112 to agent 108.

Data (*54) is the combination of data (*32)-(*34), as received from agent 114 via communication channel 1320. Data (*54) is therefore, returning to FIG. 7, the data discussed above in column 710, row 722 of table 700. In other words, agent 114 is daisy chaining the data collected from time $t_1$ to agent 108 at time $t_2$. As will be described in more detail below, data (*54) will be used by a Kalman consensus filter (not shown) of agent 108 to update the state of area of operation 100.

Similar to data (*53) discussed above, data (*54) will have stacked errors associated with the communication channels. In particular, as discussed above and shown in FIG. 7: data (*32) and data (*34) were received by agent 114 at time $t_1$ via communication channel 222, and will thus have a corresponding error; and data (*33) was received by agent 114 at time $t_1$ via communication channel 224, and will thus have a corresponding error. Each of these data will additionally have channel error parameter $\gamma_{1320}$ associated with communication channel 1320 when transmitted as data (*54) from agent 114 to agent 108.

As indicated in row 1416, column 1412, agent 108 determines: the state of agent 106, $S_{106}$, based on data (*10); the state of agent 110, $S_{110}$, based on data (*11); the state of agent 112, $S_{112}$, based on data (*12); the state of agent 114, $S_{114}$, based on data (*13); the state of target 102, $S_{102}$, based on data (*14); and the state of target 104, $S_{104}$, based on data (*9), which agent 108 detected itself as discussed above with reference to FIG. 7 and based on data (*15) and data (*16), which agent 108 had previously received at time $t_1$, as discussed above with reference to FIG. 7.

With respect to determining the state of target 104, $S_{104}$, please return to column 710, row 716 of FIG. 7. Data (*15) corresponds to a measured position of target 104 by agent 110. Data (*15) is received by agent 108 from agent 110 via communication channel 218 and having detector error parameter $\delta_{110}$. On the other hand, data (*16) corresponds to a measured position of target 104 by agent 114. It should be noted that the position of target 104 as measured by agent 110 may differ from the position of target 104 as measured by agent 114. Further, data (*16) is received by agent 108 from agent 114 via communication channel 222. It should be noted that communication channel 218 may have different errors as compared to communication channel 222. As discussed above, a Kalman consensus filter (not shown) of agent 108 is able to take into account these differences in data and communication channel errors to establish a consensus position of target 104.

As shown in FIG. 14A, row 1418 is for agent 110. As indicated in row 1418, column 1404, agent 110 detects its own position, $p_{110}$, its own velocity, $v_{110}$, and its acceleration, $a_{110}$, at time $t_2$.

As indicated in row 1418, column 1406, agent 110 additionally detects agents 108 and 114 and target 104. Returning to FIG. 13, this results from agents 108 and 114 and target 104 being within local detection area 1308 of agent 110.

Returning to FIG. 14A, as indicated in row 1418, column 1408, agent 110 transmits: data indicating its own position, $p_{110}$, its own velocity, $v_{110}$, its acceleration, $a_{110}$, at time $t_2$, as data (*55); data indicating the position of target 104, $p_{104}$, at time $t_2$, as data (*56); and data (*19)-(*22), which agent 110 had previously received at time $t_1$, as discussed above with reference to FIG. 7.

As indicated in row 1418, column 1410, agent 110 receives data (*57), data (*58), data (*59), data (*60) and data (*61).

Data (*57) is the position data of agent 108, $p_{108}$, the velocity data of agent 108, $v_{108}$, and the acceleration data of agent 108, $a_{108}$, as received from agent 108 via communication channel 1316 at time $t_2$, having channel error parameter $\gamma_{1316}$ and having detector error parameter $\delta_{108}$.

Data (*58) is the position data of agent 114, $p_{114}$, the velocity data of agent 114, $v_{114}$, and the acceleration data of agent 114, $a_{114}$, as received from agent 114 via communication channel 1322 at time $t_2$, having channel error parameter $\gamma_{1322}$ and having detector error parameter $\delta_{114}$.

Data (*59) is the position data of target 104, $p_{104}$, as received from agent 114 via communication channel 1322, having channel error parameter $\gamma_{1322}$ and having detector error parameter $\delta_{114}$.

Data (*60) is the combination of data (*10)-(*16), as received from agent 108 via communication channel 1316. Data (*60) is therefore, returning to FIG. 7, the data discussed above in column 710, row 716 of table 700. In other words, agent 108 is daisy chaining the data collected from time $t_1$ to agent 110 at time $t_2$. As will be described in more detail below, data (*60) will be used by a Kalman consensus filter (not shown) of agent 110 to update the state of area of operation 100.

As discussed above with reference to data (*54), data (*60) will have stacked errors associated with the communication channels. In particular, as discussed above and shown in FIG. 7: data (*10) and data (*14) were received by agent 108 at time $t_1$ via communication channel 212, and will thus have a corresponding error; data (*11) and data (*15) were received by agent 108 at time $t_1$ via communication channel 218, and will thus have a corresponding error; data (*12) was received by agent 108 at time $t_1$ via communication channel 220, and will thus have an associated error; and data (*13) and data (*16) were received by agent 108 at time $t_1$ via communication channel 222, and will thus have an associated error. Each of these data will additionally have channel error parameter $\gamma_{1316}$ associated with communication channel 1316 when transmitted as data (*54) from agent 108 to agent 110.

Data (*61) is the combination of data (*32)-(*34), as received from agent 114 via communication channel 1322. Data (*52) is therefore, returning to FIG. 7, the data discussed above in column 710, row 722 of table 700. In other words, agent 114 is daisy chaining the data collected from time $t_1$ to agent 110 at time $t_2$. As will be described in more detail below, data (*61) will be used by a Kalman consensus filter of agent 110 to update the state of area of operation 100.

Similar to data (*60) discussed above, data (*61) will have stacked errors associated with the communication channels. In particular, as discussed above and shown in FIG. 7: data (*32) and data (*34) were received by agent 114 at time $t_1$ via communication channel 222, and will thus have a corresponding error; and data (*33) was received by agent 114 at time $t_1$ via communication channel 224, and will thus have a corresponding error. Each of these data will additionally have channel error parameter $\gamma_{1322}$ associated with communication channel 1322 when transmitted as data (*61) from agent 114 to agent 110.

As indicated in row 1418, column 1412, agent 110 determines: the state of agent 106, $S_{106}$, based on data (*19); the state of agent 108, $S_{108}$, based on data (*20); the state of target 102, $S_{102}$, based on data (*21); and the state of target 104, $S_{104}$, based on data (*18), which agent 110 detected itself as discussed above with reference to FIG. 7, and based on data (*22) which agent 110 had previously received at time $t_1$, as discussed above with reference to FIG. 7.

As shown in FIG. 14B, row 1420 is for agent 112. As indicated in row 1420, column 1404, agent 112 detects its own position, $p_{112}$, its own velocity, $v_{112}$, and its acceleration, $a_{112}$, at time $t_2$.

As indicated in row 1420, column 1406, agent 112 additionally detects agents 106 and 108 and target 102. Returning to FIG. 13, this results from agents 106 and 108 and target 102 being within local detection area 1308 of agent 112.

Returning to FIG. 14B, as indicated in row 1420, column 1408, agent 112 transmits: data indicating its own position, $p_{112}$, its own velocity, $v_{112}$, its acceleration, $a_{112}$, at time $t_2$, as data (*62); data indicating the position of target 102, $p_{102}$, at time $t_2$, as data (*63); and data (*24)-(*29), which agent 112 had previously received at time $t_1$, as discussed above with reference to FIG. 7.

As indicated in row 1420, column 1410, agent 112 receives data (*64), data (*65), data (*66), data (*67) and data (*68).

Data (*64) is the position data of agent 106, $p_{106}$, the velocity data of agent 106, $v_{106}$, and the acceleration data of agent 106, $a_{106}$, as received from agent 106 via communication channel 1312 at time $t_2$, having channel error parameter $\gamma_{1312}$ and having detector error parameter $\delta_{106}$.

Data (*65) is the position data of agent 108, $p_{108}$, the velocity data of agent 108, $v_{108}$, and the acceleration data of agent 108, $a_{108}$, as received from agent 108 via communication channel 1318 at time $t_2$, having channel error parameter $\gamma_{1318}$ and having detector error parameter $\delta_{108}$.

Data (*66) is the position data of target 102, $p_{102}$, as received from agent 106 via communication channel 1312, having channel error parameter $\gamma_{1312}$ and having detector error parameter $\delta_{106}$.

Data (*67) is the combination of data (*3)-(*7), as received from agent 106 via communication channel 1312. Data (*67) is therefore, returning to FIG. 7, the data discussed above in column 710, row 714 of table 700. In other words, agent 106 is daisy chaining the data collected from time $t_1$ to agent 112 at time $t_2$. As will be described in more detail below, data (*67) will be used by a Kalman consensus filter (not shown) of agent 112 to update the state of area of operation 100.

Similar to data (*61) discussed above, data (*67) will have stacked errors associated with the communication channels. In particular, as discussed above and shown in FIG. 7: data (*3) and data (*3) were received by agent 106 at time $t_1$ via communication channel 212, and will thus have a corresponding error; data (*4) and data (*7) were received by agent 106 at time $t_1$ via communication channel 214, and will thus have a corresponding error; and data (*5) was received by agent 106 at time $t_1$ via communication channel 216, and will thus have a corresponding error. Each of these data will additionally have channel error parameter $\gamma_{1312}$ associated with communication channel 1312 when transmitted as data (*67) from agent 106 to agent 112.

Data (*68) is the combination of data (*10)-(*16), as received from agent 108 via communication channel 1318. Data (*68) is therefore, returning to FIG. 7, the data discussed above in column 710, row 716 of table 700. In other words, agent 108 is daisy chaining the data collected from time $t_1$ to agent 112 at time $t_2$. As will be described in more detail below, data (*68) will be used by a Kalman consensus filter (not shown) of agent 112 to update the state of area of operation 100.

As discussed above with reference to data (*67), data (*68) will have stacked errors associated with the communication channels. In particular, as discussed above and shown in FIG. 7: data (*10) and data (*14) were received by agent 108 at time $t_1$ via communication channel 212, and will thus have a corresponding error; data (*11) and data (*15) were received by agent 108 at time $t_1$ via communication channel 218, and will thus have a corresponding error; data (*12) was received by agent 108 at time $t_1$ via communication channel 220, and will thus have an associated error; and data (*13) and data (*16) were received by agent 108 at time $t_1$ via communication channel 222, and will thus have an associated error. Each of these data will additionally have having channel error parameter $\gamma_{1318}$ associated with communication channel 1318 when transmitted as data (*68) from agent 108 to agent 112.

As indicated in row 1420, column 1412, agent 112 determines: the state of agent 106, $S_{106}$, based on data (*24); the state of agent 108, $S_{108}$, based on data (*25); the state of agent 114, $S_{114}$, based on data (*26); the state of target 102, $S_{102}$, based on data (*27); and the state of target 104, $S_{104}$, based on data (*28) and data (*29), which agent 112 had previously received at time $t_1$, as discussed above with reference to FIG. 7.

With respect to determining the state of target 104, $S_{104}$, please return to column 710, row 720 of FIG. 7. Data (*28) corresponds to a measured position of target 104 by agent 108. Data (*28) is received by agent 114 from agent 108 via communication channel 220 having channel error parameter $\gamma_{220}$ and having and having detector error parameter $\delta_{108}$. On the other hand, data (*29) corresponds to a measured position of target 104 by agent 114 via communication channel 224 having channel error parameter $\gamma_{224}$ and having and having detector error parameter $\delta_{114}$. It should be noted that the position of target 104 as measured by agent 108 may differ from the position of target 104 as measured by agent 114. Further, data (*29) is received by agent 112 from agent 114 via communication channel 224. It should be noted that communication channel 220 may have different errors as compared to communication channel 224. As discussed above, a Kalman consensus filter (not shown) of agent 114 is able to take into account these differences in data and communication channel errors to establish a consensus position of target 104.

As shown in FIG. 14B, row 1422 is for agent 114. As indicated in row 1422, column 1404, agent 114 detects its own position, $p_{114}$, its own velocity, $v_{114}$, and its acceleration, $a_{114}$, at time $t_2$.

As indicated in row 1422, column 1406, agent 114 additionally detects agents 108 and 110 and target 104. Returning to FIG. 13, this results from agents 108 and 110 and target 104 being within local detection area 1310 of agent 114.

Returning to FIG. 14B, as indicated in row 1422, column 1408, agent 114 transmits: data indicating its own position, $p_{114}$, its own velocity, $v_{114}$, its acceleration, $a_{114}$, at time $t_2$, as data (*69); data indicating the position of target 104, $p_{104}$, at time $t_2$, as data (*70); and data (*32)-(*34), which agent 114 had previously received at time $t_1$, as discussed above with reference to FIG. 7.

As indicated in row 1422, column 1410, agent 114 receives data (*71), data (*72), data (*73), data (*74) and data (*75).

Data (*71) is the position data of agent 108, $p_{108}$, the velocity data of agent 108, $v_{108}$, and the acceleration data of agent 108, $a_{108}$, as received from agent 108 via communication channel 1320 at time $t_2$, having channel error parameter $\gamma_{1320}$ and having detector error parameter $\delta_{108}$.

Data (*72) is the position data of agent 110, $p_{110}$, the velocity data of agent 110, $v_{110}$, and the acceleration data of agent 110, $a_{110}$, as received from agent 110 via communication channel 1322 at time $t_2$, having channel error parameter $\gamma_{1322}$ and having detector error parameter $\delta_{110}$.

Data (*73) is the position data of target 104, $p_{104}$, as received from agent 108 via communication channel 1320, having channel error parameter $\gamma_{1320}$ and having detector error parameter $\delta_{108}$.

Data (*74) is the combination of data (*10)-(*16), as received from agent 108 via communication channel 1318. Data (*74) is therefore, returning to FIG. 7, the data discussed above in column 710, row 716 of table 700. In other words, agent 108 is daisy chaining the data collected from time $t_1$ to agent 114 at time $t_2$. As will be described in more detail below, data (*74) will be used by a Kalman consensus filter (not shown) of agent 114 to update the state of area of operation 100.

As discussed above with reference to data (*68), data (*74) will have stacked errors associated with the communication channels. In particular, as discussed above and shown in FIG. 7: data (*10) and data (*14) were received by agent 108 at time $t_1$ via communication channel 212, and will thus have a corresponding error; data (*11) and data (*15) were received by agent 108 at time $t_1$ via communication channel 218, and will thus have a corresponding error; data (*12) was received by agent 108 at time $t_1$ via communication channel 220, and will thus have an associated error; and data (*13) and data (*16) were received by agent 108 at time $t_1$ via communication channel 222, and will thus have an associated error. Each of these data will additionally have channel error parameter $\gamma_{1320}$ associated with communication channel 1320 when transmitted as data (*74) from agent 108 to agent 114.

Data (*75) is the combination of data (*19)-(*22), as received from agent 110 via communication channel 1322. Data (*75) is therefore, returning to FIG. 7, the data discussed above in column 710, row 718 of table 700. In other words, agent 110 is daisy chaining the data collected from time $t_1$ to agent 114 at time $t_2$. As will be described in more detail below, data (*75) will be used by a Kalman consensus filter (not shown) of agent 114 to update the state of area of operation 100.

Similar to data (*74) discussed above, data (*75) will have stacked errors associated with the communication channels. In particular, as discussed above and shown in FIG. 7: data (*19) and data (*21) were received by agent 110 at time $t_1$ via communication channel 214, and will thus have a corresponding error; and data (*20) and data (*22) were received by agent 110 at time $t_1$ via communication channel 218, and will thus have a corresponding error. Each of these data will additionally have channel error parameter $\gamma_{1322}$ associated with communication channel 1322 when transmitted as data (*75) from agent 110 to agent 114.

As indicated in row 1422, column 1412, agent 114 determines: the state of agent 108, $S_{108}$, based on data (*32); the state of agent 112, $S_{112}$, based on data (*33); and the state of target 104, $S_{104}$, based on data (*31), which agent 114 detected itself as discussed above with reference to FIG. 7, and based on data (*34), which agent 114 had previously received at time $t_1$, as discussed above with reference to FIG. 7.

Please consider the following items of note with respect to table 1400 of FIGS. 14A-B.

Among the data received by agent 106, data (*40) and data (*41) will be used by DAC component 608, at time $t_3$, which will be discussed in more detail below with reference to FIGS. 17A, in a manner similar to that discussed above with reference to FIG. 6. In particular, the daisy chained data will be used to more accurately determine position data via a Kalman filter. The same will apply to agent 108 and data (*51-54), agent 110 and data (*60-*61), agent 112 and data (*67-*68) and agent 114 and data (*74-*75).

Further, similar to that discussed above with reference to FIG. 7: among the data received by agent 108, data (*47 and *49) associated with target 102 and data (*48 and *50) associated with target 104 will be address by the KCF (not shown) of agent 108 at time $t_3$; among the data received by agent 110, data (*47 and *49) associated with target 102 and data (*48 and *50) associated with target 104 will be address by the KCF (not shown) of agent 108 at time $t_3$.

Still further, as mentioned previously with reference to FIG. 7, at time $t_2$, as shown in FIGS. 14A-B, KCF 602 actually determines a consensus of parameters when more than one set of data for a particular parameter is received. In this example, as shown in column 1412 of table 1400 of FIGS. 14A-B in: row 1414 for agent 106 with reference to the determination of the state of target 104, $S_{104}$, which is determined based on data (*6-*7); row 1416 for agent 108 with reference to the determination of the state of target 104, $S_{104}$, which is determined based on data (*9, *15, *16); row 1418 for agent 110 with reference to the determination of the state of target 104, $S_{104}$, which is determined based on data (*18, *22); row 1420 for agent 112 with reference to the determination of the state of target 104, $S_{104}$, which is determined based on data (*28, *29); and row 1422 for agent 114 with reference to the determination of the state of target 104, $S_{104}$, which is determined based on data (*31, *34).

As shown in FIGS. 14A-B, particularly the information in column 1412, the agents are deriving an overall picture of the state of area of operation 100 based solely on each agent detecting parameters within its respective local area. This overall picture of the state of area of operation 100 will become more accurate as time goes by and when daisy chained data is included, as will be described in more detail with respect to FIGS. 15-17B.

Figure 15:
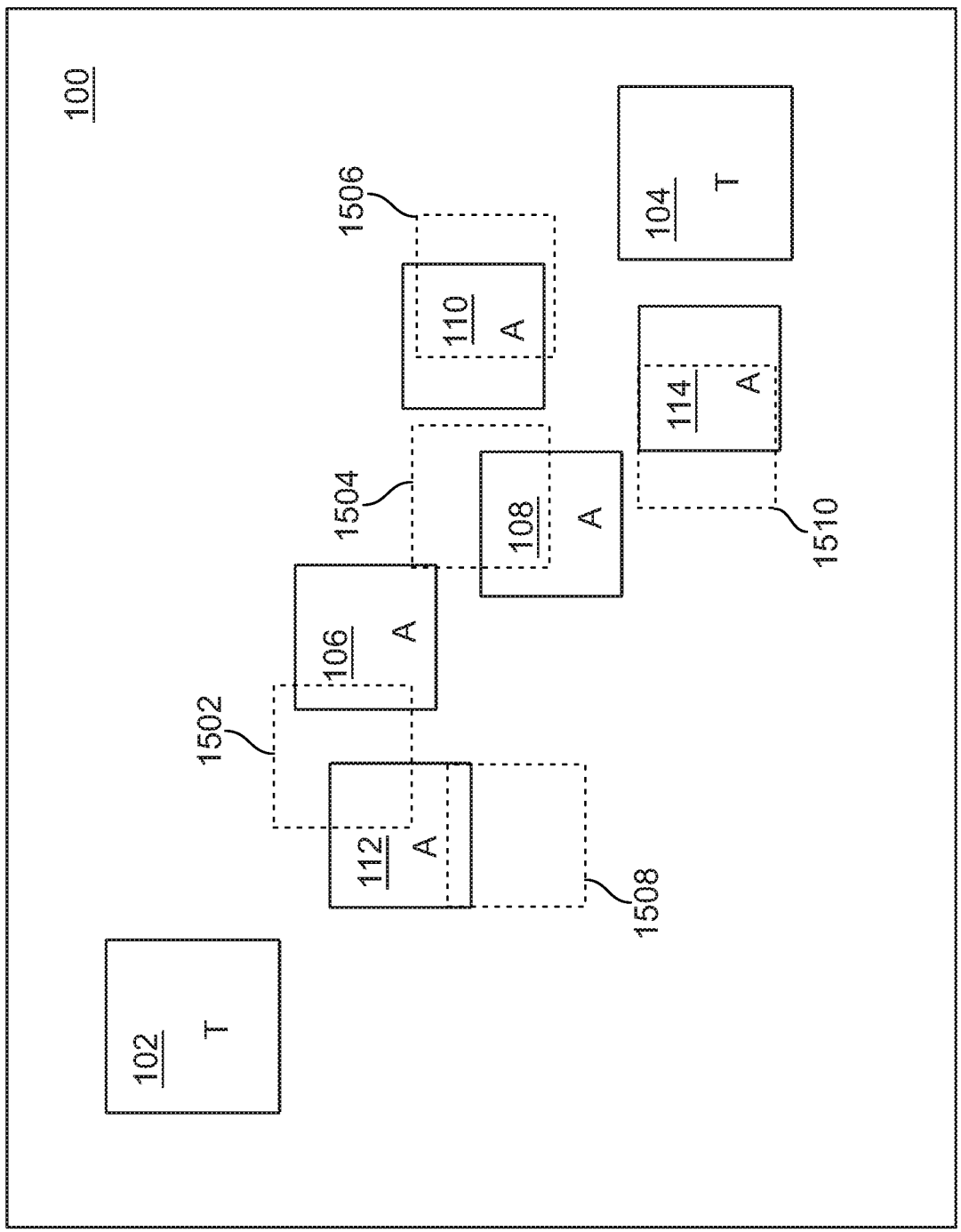
FIG. 15 illustrates the area of operation of FIG. 1, having autonomous agents and targets dispersed therein, at a time $t_3$.

FIG. 15 illustrates area of operation 100 having autonomous agents and targets dispersed therein, at a time $t_3$. For purposes of comparison, the position of each agent at time $t_2$ as shown in FIG. 13 is illustrated with a dotted box. In particular, at time $t_2$ as shown in FIG. 13, agent 106 was in the location illustrated by dotted box 1502, agent 108 was in the location illustrated by dotted box 1504, agent 110 was in the location illustrated by dotted box 1506, agent 112 was in the location illustrated by dotted box 1508 and agent 114 was in the location illustrated by dotted box 1510.

Figure 16:
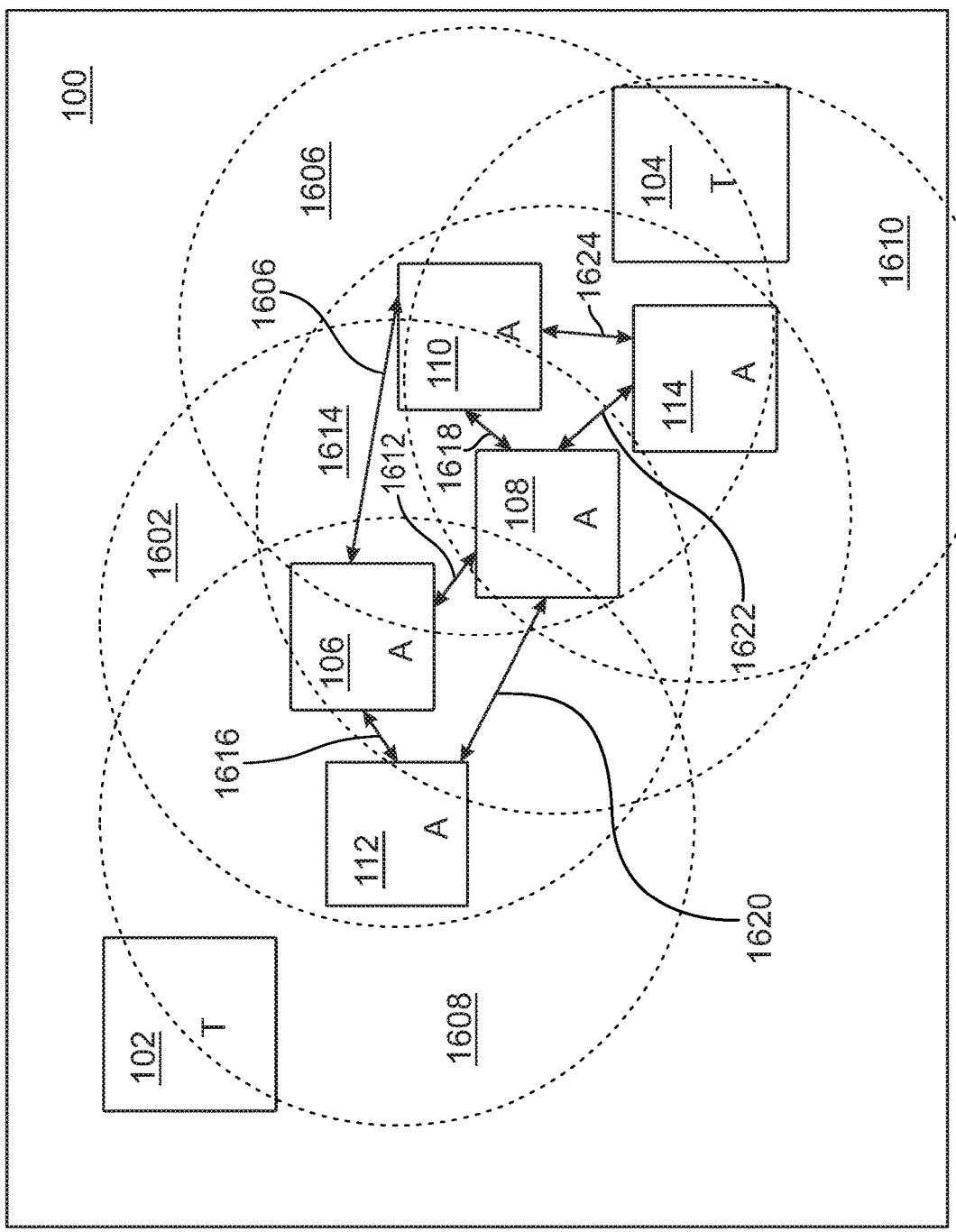
FIG. 16 illustrates the area of operation of FIG. 15, at time $t_3$, with local areas and communication channels associated with the autonomous agents.

FIG. 16 illustrates the area of operation of FIG. 5, at time $t_3$, with local areas and communication channels associated with the autonomous agents.

As shown in FIG. 16, agent 106 has a local detection area 1602, agent 108 has a local detection area 1604, agent 110 has a local detection area 1606, agent 112 has a local detection area 1608 and agent 114 has a local detection area 1610.

In FIG. 16, agent 106 is positioned such that agent 108, agent 110 and agent 112 are in local detection area 1602. Agent 108 is positioned such that agent 106, agent 110, agent 112, agent 114 and target 104 are in local detection area 1604. Agent 110 is positioned such that agent 106, agent 108, agent 114 and target 104 are in local detection area 1606. Agent 112 is positioned such that agent 106, agent 108 and target 102 are in local detection area 1308. Agent 114 is positioned such that agent 108, agent 110 and target 104 are in local detection area 1610.

In FIG. 16, agent 106 is operable to bi-directionally communicate with agent 108 via a communication channel 1612, to bi-directionally communicate with agent 110 via a communication channel 1614 and to bi-directionally communicate with agent 112 via a communication channel 1616. Agent 108 is additionally operable to bi-directionally communicate with agent 110 via a communication channel 1618, to bi-directionally communicate with agent 112 via a communication channel 1620 and to bi-directionally communicate with agent 114 via a communication channel 1622. Agent 110 is additionally operable to bi-directionally communicate with agent 114 via a communication channel 1624.

FIGS. 17A-B illustrate a table of information 1700 related to the environment of area of operation 100 at time $t_3$ as shown in FIG. 16.

As shown in FIGS. 17A-B, table 1700 includes an agent column 1702, a detected parameters column 1704, a detected agents/target column 1706, a transmits column 1708 a receives column 1710 a determines column 1712, a row 1714 for agent 106, a row 1716 for agent 108, a row 1718 for agent 110, a row 1720 for agent 112 and a row 1722 for agent 114. FIG. 17A includes rows 1714 and 1716, whereas FIG. 17B continues with rows 1718, 1720 and 1722.

FIGS. 17A-B illustrate a table of information 1700 related to the environment of area of operation 100 at time $t_3$ as shown in FIG. 16.

As shown in FIGS. 17A-B, table 1700 includes an agent column 1702, a detected parameters column 1704, a detected agents/target column 1706, a transmits column 1708 a receives column 1710 a determines column 1712, a row 1714 for agent 106, a row 1716 for agent 108, a row 1718 for agent 110, a row 1720 for agent 112 and a row 1722 for agent 114. FIG. 17A includes rows 1714 and 1716, whereas FIG. 17B continues with rows 1718, 1720 and 1722.

The columns of FIGS. 17A-B are similar to the columns of FIGS. 14A-14 B discussed above, but are drawn to area of operation 100 at time $t_3$ as shown in FIG. 16.

As shown in FIG. 17A, row 1714 is for agent 106. As indicated in row 1714, column 1704, agent 106 detects its own position, $p_{106}$, its own velocity, $v_{106}$, and its acceleration, $a_{106}$, at time $t_3$. Further, agent 106 detects the position, $p_{102}$, of target 102 at time $t_3$.

As indicated in row 1714, column 1706, agent 106 detects agents 108, 110 and 112. Returning to FIG. 16, this results from agents 108, 110 and 112 being within local detection area 1602 of agent 106.

Returning to FIG. 17A, as indicated in row 1714, column 1708, agent 106 transmits: data indicating its own position, $p_{106}$, its own velocity, $v_{106}$, its acceleration, $a_{106}$, at time $t_3$, as data (*76); and data (*37)-(*41), which agent 106 had previously received at time $t_2$, as discussed above with reference to FIG. 14A. This daisy-chaining of data (*37)-(*41) will assist other agents in determining the environment state of area of operation 100.

As indicated in row 1714, column 1710, agent 106 receives data (*77), data (*78), data (*79), data (*80), data (*81), data (*82), data (*83), data (*84) and data (*85). Data (*77) is the position data of agent 108, $p_{108}$, the velocity data of agent 108, $v_{108}$, and the acceleration data of agent 108, $a_{108}$, as received from agent 108 via communication channel 1610 at time $t_3$, having an channel error parameter $\gamma_{1612}$ and having detector error parameter $\delta_{108}$.

Data (*78) is the position data of agent 110, $p_{110}$, the velocity data of agent 110, $v_{110}$, and the acceleration data of agent 110, $a_{110}$, as received from agent 110 via communication channel 1606 at time $t_3$, having an channel error parameter $\gamma_{1606}$ and having detector error parameter $\delta_{110}$.

Data (*79) is the position data of agent 112, $p_{112}$, the velocity data of agent 112, $v_{112}$, and the acceleration data of agent 112, $a_{112}$, as received from agent 112 via communication channel 1616 at time $t_3$, having an channel error parameter $\gamma_{1616}$ and having detector error parameter $\delta_{112}$.

Data (*80) is the position data of target 104, $p_{104}$, as received from agent 108 via communication channel 1612, having channel error parameter $\gamma_{1612}$ and detector error parameter $\delta_{108}$.

Data (*81) is the position data of target 104, $p_{104}$, as received from agent 110 via communication channel 1606, having channel error parameter $\gamma_{1606}$ and detector error parameter $\delta_{110}$.

Data (*82) is the position data of target 102, $p_{102}$, as received from agent 112 via communication channel 1616, having channel error parameter $\gamma_{1616}$ and detector error parameter $\delta_{112}$.

Data (*83) is the combination of data (*43)-(*54), as received from agent 108 via communication channel 1612. Data (*83) is therefore, returning to FIG. 14A, the data discussed above in column 1410, row 1416 of table 1400. In other words, agent 108 is daisy chaining the data collected from time $t_2$ to agent 106 at time $t_3$. As will be described in more detail below, data (*83) will be used by KCF 602 of agent 106 to update the state of area of operation 100.

It should be noted that data (*83) will have stacked errors associated with the communication channels. In particular, as discussed above and shown in FIG. 14A: data (*43), data (*47) and data (*51) were received by agent 108 at time $t_2$ via communication channel 1314, and will thus have a corresponding error; data (*44), data (*48) and data (*52) were received by agent 108 at time $t_2$ via communication channel 1316, and will thus have a corresponding error; data (*45), data (*49) and data (*53) were received by agent 108 at time $t_2$ via communication channel 1318, and will thus have an associated error; and data (*47) and data (*50) were received by agent 108 at time $t_2$ via communication channel 1314, and will thus have an associated error. Each of these data will additionally have channel error parameter $\gamma_{1612}$ associated with communication channel 1612 when transmitted as data (*83) from agent 108 to agent 106.

Data (*84) is the combination of data (*57)-(*61), as received from agent 110 via communication channel 1606. Data (*84) is therefore, returning to FIG. 14A, the data discussed above in column 1410, row 1418 of table 1400. In other words, agent 110 is daisy chaining the data collected from time $t_2$ to agent 106 at time $t_3$. As will be described in more detail below, data (*84) will be used by KCF 602 of agent 106 to update the state of area of operation 100.

Similar to data (*83) discussed above, data (*84) will have stacked errors associated with the communication channels. In particular, as discussed above and shown in FIG. 14A: data (*57) and data (*60) were received by agent 110 at time $t_2$ via communication channel 1316, and will thus have a corresponding error; and data (*58), data (59*) and data (*61) were received by agent 110 at time $t_2$ via communication channel 1322, and will thus have a corresponding error. Each of these data will additionally have channel error parameter $\gamma_{1606}$ associated with communication channel 1606 when transmitted as data (*84) from agent 110 to agent 106.

Column 1712 indicates the information that is determined by a respective agent. It should be noted that the information that is determined at time $t_n$ is based on information that is received by the agent at a previous time $t_{n-1}$. For example, the first entry in column 1712, row 1714 of table 1700 is "$S_{106}$(*1, *76)," which means that agent 106 determines the state of agent 106, $S_{106}$, based on the data (*1), which is identified in column 708, row 714, of table 700 of FIG. 7 and based on data (*36), which is identified in column 1408, row 1414, of table 1400 of FIG. 14A. In particular, data (*1) was detected by agent 106 at time $t_1$, whereas data (*36) was detected by agent 106 at time $t_2$. Data from time $t_1$ is used to update the Kalman filter, in conjunction with the data from time $t_2$.

As further indicated in row 1714, column 1712, agent 106 additionally determines: the state of agent 108, $S_{108}$, based on data (*3), data (*37) and data (*25); the state of agent 110, $S_{110}$, based on data (*4); the state of agent 112, $S_{112}$, based on data (*5), data (*38) and data (*12); the state of agent 114, $S_{114}$, based on data (*13) and data (*26); the state of target 102, $S_{102}$, based on data (*39) and data (*27); and the state of target 104, $S_{104}$, based on data (*6), data (*7), date (*15), data (*16), data (*28) and data (*29), which agent 106 had previously received at time $t_2$, as discussed above with reference to FIG. 14A.

With respect to determining the state of agent 108, $S_{108}$, in a manner similar to the determining of the state of target 104, $S_{104}$, discussed above with reference to FIG. 14A, column 1412, row 1414, KCF 602 of controller 406 of agent 106 is able to take into account differences in data and communication channel errors to establish a consensus of the state of agent 108. Similarly, KCF 602 of controller 406 of agent 106 is able to take into account differences in data and communication channel errors to establish a consensus of the state of agent 112, agent 114, target 102 and target 104.

For the purpose of brevity, the remainder of the information listed in FIGS. 17A-B will not be discussed, as it would be well understood in light of the detailed discussion above with reference to FIGS. 14A-B.

Please consider the following items of note with respect to table 1700 of FIGS. 17A-B.

In this example, as shown in column 1712 of table 1700 of FIGS. 17A-B, all of the agents are using multiple data sets to determine states of all other agents and targets within area of operation 100. As discussed above, with reference to FIGS. 8-10, in accordance with aspects of the present invention, by using a KCF, a determined consensus of a parameter takes into account errors in the system, including those associated with detectors and communication channels between agents. Further, as more iterations are performed, the more accurate that state determination will become. Still further, is more agents are used, then the determined consensus will be more accurate as a result of the additional contributions.

Returning to FIG. 3, if it is determined that the device is within the reward function (Yes at S312), then the method 300 stops (S316).

The above discussed embodiment is provided merely for purposes of describing aspects of the present disclosure. Other multi-agents tasks may be performed in accordance with aspects of the present disclosure.

Figure 18:
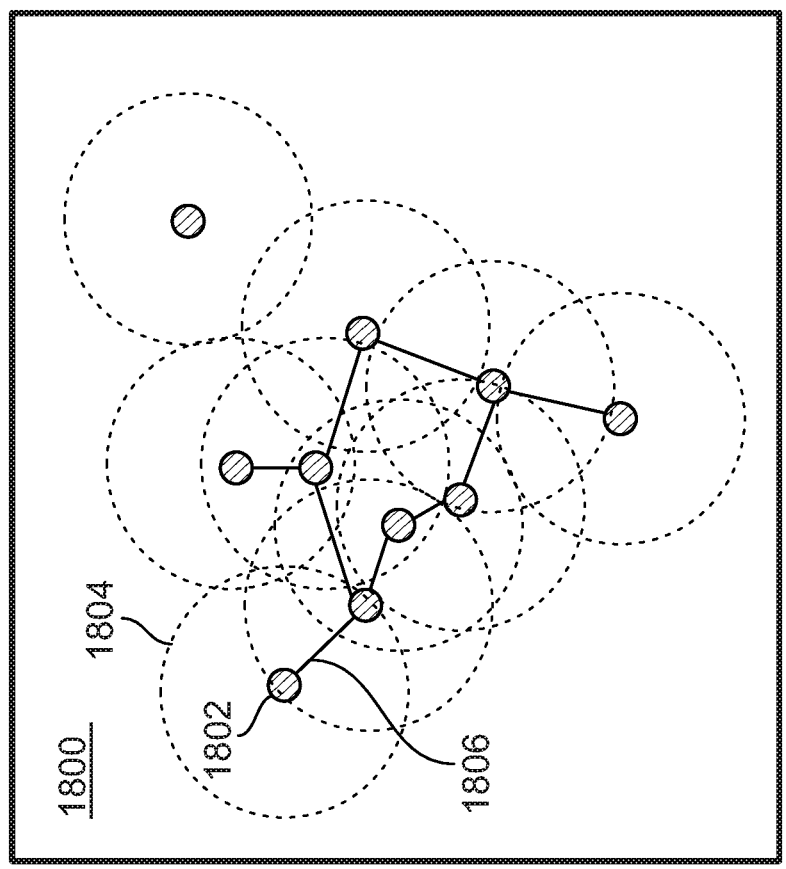
FIG. 18 illustrates an experimental environment of a multi-agent coordination graph connect task in accordance with aspects of the present disclosure.

FIG. 18 illustrates an experimental environment of a multi-agent coordination graph connect task in accordance with aspects of the present disclosure.

As shown in the figure, an area of operation 1800 includes a plurality of agents, a sample of which is indicated as agent 1802, a corresponding local area of operation for each respective agent, a sample of which is indicated as dotted circle 1804, and a number of connections, a sample of which is indicated as connection 1806.

In the Graph Connect task of FIG. 18, agents are counted as connected if they are within range $r_c$ of one another. It should be noted that this is distinct from a communication graph $\varepsilon_t$, because agents may still experience link failures while satisfying the criteria of their reward function. Each agent receives reward proportional to its distance from the agents it is connected to $R^i_t$ defined as follows:

$$R^i_t = \sum_{j \in \{j: \|x^i_t - x^j_t\|^2 < r_c\}} \|x^i_t - x^j_t\|^2 \quad (2)$$

In this task, agents must localize one another and congregate; however, once they are connected they are also incentivized to spread as far as possible without losing their established links.

Figure 19:
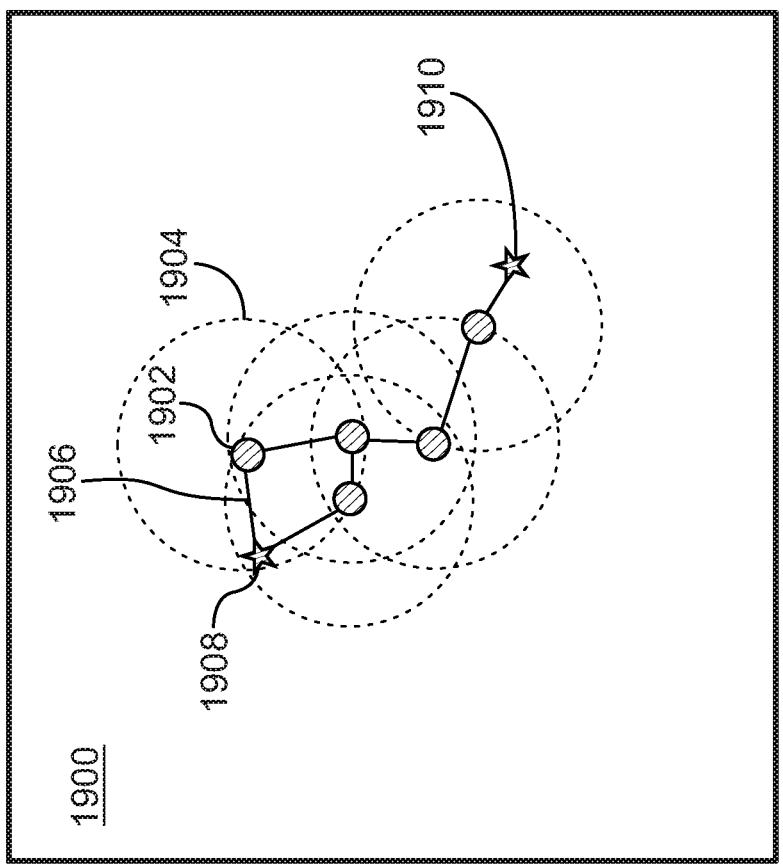
FIG. 19 illustrates an experimental environment of a multi-agent coordination ad-hoc link task in accordance with aspects of the present disclosure.

FIG. 19 illustrates an experimental environment of a multi-agent coordination ad-hoc link task in accordance with aspects of the present disclosure.

As shown in the figure, an area of operation 1900 includes a plurality of agents, a sample of which is indicated as agent 1902, a corresponding local area of operation for each respective agent, a sample of which is indicated as dotted circle 1804, a number of connections, a sample of which is indicated as connection 1906, a star 1908 and a star 1910.

In the Ad-Hoc Link task of FIG. 19, agents must arrange themselves so as to connect two landmark points of interest $l^a$, $l^b$ (star 1908 and star 1910); agents are considered connected using the same range convention as in the Graph Connect task discussed above with reference to FIG. 18. In the task of FIG. 19, a minimal shortest path is preferred between the two landmarks expressed by the reward function $R^i_t$ defined as follows:

$$R^i_t = \frac{\|l^a - l^b\|^2}{\delta(l^a, l^b)} \forall i \in \mathcal{N} \quad (3)$$

where $\delta(l^a, l^b)$ is the weight of the shortest path connecting $l^a$, $l^b$.

Figure 20:
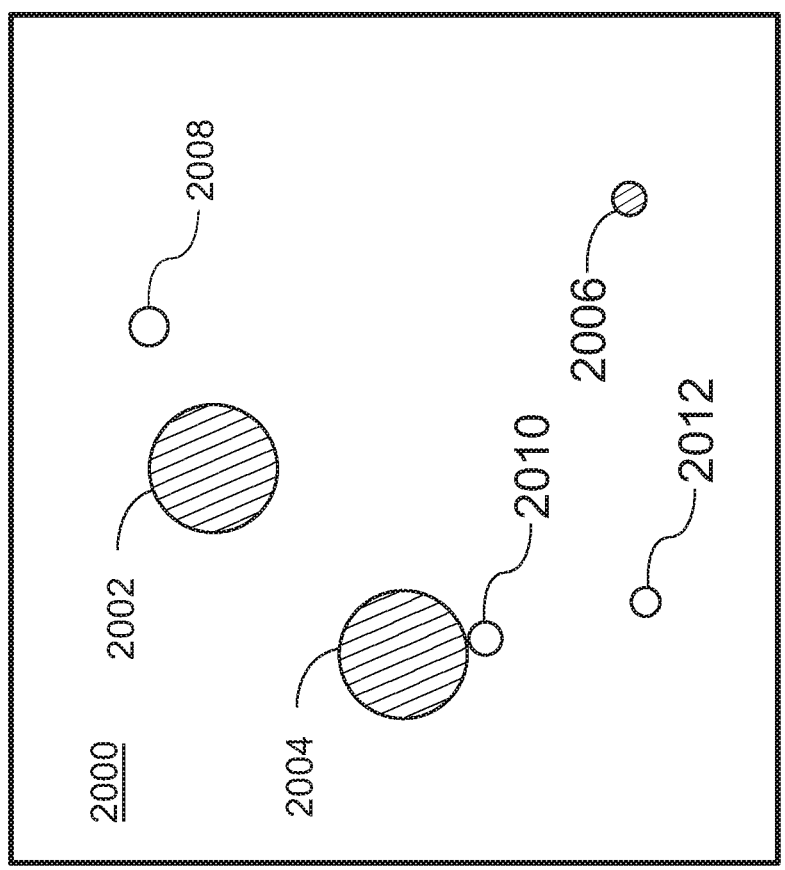
FIG. 20 illustrates an experimental environment of a multi-agent coordination predator-prey task in accordance with aspects of the present disclosure.

FIG. 20 illustrates an experimental environment of a multi-agent coordination predator-prey task in accordance with aspects of the present disclosure In the Predator-Prey task of FIG. 20, in the area of interest 2000, the team of slowly accelerating predators 2008, 2010 and 2012 must coordinate to capture the agile prey 2006, while avoiding obstacles 2002 and 2004. The task dynamics and reward function are reproduced known; where task of the present disclosure differs however is in the introduction of explicit stochastic communication and limited observability. In the original work, agents observed position and velocity of other agents on their team and position for agents on the opposing team. In accordance with the present disclosure, agents are limited to only observing position; this is motivated by an interest in testing the efficacy of a Kalman consensus filter approach in an environment where velocity estimates play a strong role in effective decision making.

In a system and method in accordance with aspects of the present disclosure, the agents are required to share only local state information; this enables the multi-agent reinforcement problem (MARL) to be solved (i.e. to "converge") even with imperfect communication between distal agents. This represents a significantly more realistic and applicable scenario for multi-agent systems acting outside of a laboratory environment. Thus, a system and method in accordance with aspects of the present disclosure makes a significant contribution to the usability of such techniques in various physical implementations.

A distributed consensus approach outperforms simpler methods in three exemplar tasks, for example as discussed above with reference to FIGS. 18-20. In particular, a Kalman consensus filter proves most effective in the Graph Connect and Predator-Prey scenarios. It stands to reason that this approach leverages Kalman consensus filter's ability to estimate agent velocities where pursuit is crucial to effective behavior. A Distributed Average Consensus (DAC) is most effective in the Ad-Hoc Link task, which may be partially explained by the stationarity of objective locations in the environment and increased importance of relative positions of agents (rather than their trajectories).

A system and method in accordance with aspects of the present disclosure requires only for local information from each actor and does not require cooperative behavior during a multi-agent task.

It should be noted that the chosen tasks are irrelevant, in accordance with aspects of the present disclosure. A local reward policy given local state observations is sufficient to utilize this technique for any task in which actors must effect actions and receive reward for doing so. Further, actors may also communicate their action choices along with a local state. Still further, the specific level of communications reliability may be considered an independent variable, and should not change aspects of the present disclosure.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A system for performing a predetermined function within a total area of operation, said system comprising:

a first autonomous agent comprising a first agent detector, a first agent communication component and a first agent controller, said first agent detector being operable to detect a first agent parameter within a first agent area and to generate a first agent parameter signal based on the detected first agent parameter, said first agent controller comprising a task controller and a first Kalman consensus filter and being operable to instruct said first autonomous agent to perform an initial first agent task and to perform a subsequent first agent task, wherein the first Kalman consensus filter comprises a Kalman filter component and a distributed average consensus component;

a second autonomous agent comprising a second agent detector, a second agent communication component and a second agent controller, said second agent detector being operable to detect a second agent parameter within a second agent area and to generate a second agent parameter signal based on the detected second agent parameter, said second agent communication component being operable to transmit the second agent parameter signal to said first agent communication component, said second agent controller being operable to instruct said second autonomous agent to perform an initial second agent task and to perform a subsequent second agent task;

a third autonomous agent comprising a third agent detector, a third agent communication component and a third agent controller, said third agent detector being operable to detect a third agent parameter within a third agent area and to generate a third agent parameter signal based on the detected third agent parameter, said third agent communication component being operable to transmit the third agent parameter signal to said first agent communication component and to said second agent communication component, said third agent controller being operable to instruct said third autonomous agent to perform an initial third agent task and to perform a subsequent third agent task; and wherein said first agent communication component is operable to transmit the first agent parameter signal to said second agent communication component and to said third agent communication component, wherein said second agent communication component is further operable to transmit the second agent parameter signal to said third agent communication component, and operable to transmit the received third agent parameter signal to the first agent communication component, wherein said first agent controller is operable to instruct said first autonomous agent to perform said subsequent first agent task based on the first agent parameter signal, the second agent parameter signal, the third agent parameter signal and a predetermined reward function using reinforcement learning and a first Kalman consensus filter, wherein said second agent controller is operable to instruct said second autonomous agent to perform said subsequent second agent task based on the first agent parameter signal, the second agent parameter signal, the third agent parameter signal and the predetermined reward function using reinforcement learning and a second Kalman consensus filter, wherein said third agent controller is operable to instruct said third autonomous agent to perform said subsequent third agent task based on the first agent parameter signal, the second agent parameter signal, the third agent parameter signal and the predetermined reward function using reinforcement learning and a third Kalman consensus filter, and also operable to transmit the received second agent parameter signal to the first agent communication component, wherein the first Kalman consensus filter is operable to output a second agent parameter consensus based on the second agent parameter signal received from the second agent communication component and the received second agent parameter signal received from the third agent communication component, wherein the task controller is configured to instruct the first autonomous agent to perform the subsequent first agent task based on the second agent parameter consensus, wherein the Kalman filter component is configured to generate a local state signal, and the distributed average consensus component is configured to generate the second agent parameter consensus based on a weighted average of a first product of the second agent parameter signal received from the second agent communication component and a first weighting factor of the second agent parameter signal received from the second agent communication component and a second product of the received second agent parameter signal received from the third agent communication component and a second weighting factor of the received second agent parameter signal received from the third agent communication component, wherein the first weighting factor is based on distance, wherein the first agent area is less than and within the total area of operation, and wherein the second agent area is less than and within the total area of operation.

2. The system of claim 1, wherein said first agent detector comprises a detector selected from a group of detectors comprising a position detector, a velocity detector, an acceleration detector and combinations thereof, wherein the position detector is operable to detect a position selected from a group of positions comprising a first agent position of the first autonomous agent, a second agent position of said second autonomous agent when said second autonomous agent is within the first agent area and a combination thereof, wherein the velocity detector is operable to detect a velocity selected from a group of velocities comprising a first agent velocity of the first autonomous agent, a second agent velocity of said second autonomous agent when said second autonomous agent is within the first agent area and a combination thereof, and wherein the acceleration detector is operable to detect an acceleration selected from a group of accelerations comprising a first agent acceleration of the first autonomous agent, a second agent acceleration of said second autonomous agent when said second autonomous agent is within the first agent area and a combination thereof.

3. A method performing a predetermined function within a total area of operation, the method comprising:

providing a first autonomous agent comprising a first agent detector, a first agent communication component and a first agent controller, the first agent detector being operable to detect a first agent parameter within a first agent area and to generate a first agent parameter signal based on the detected first agent parameter, the first agent controller being operable to instruct the first autonomous agent to perform an initial first agent task and to perform a subsequent first agent task;

providing a second autonomous agent comprising a second agent detector, a second agent communication component and a second agent controller, the second agent detector being operable to detect a second agent parameter within a second agent area and to generate a second agent parameter signal based on the detected second agent parameter, the second agent communication component being operable to transmit the second agent parameter signal to the first agent communication component, the second agent controller being operable to instruct the second autonomous agent to perform an initial second agent task and to perform a subsequent second agent task; and providing a third autonomous agent comprising a third agent detector, a third agent communication component and a third agent controller, the third agent detector being operable to detect a third agent parameter within a third agent area and to generate a third agent parameter signal based on the detected third agent parameter, the third agent communication component being operable to transmit the third agent parameter signal to the first agent communication component and to the second agent communication component, the third agent controller being operable to instruct the third autonomous agent to perform an initial third agent task and to perform a subsequent third agent task;

transmitting, from the first agent communication component, a first agent parameter signal to the second agent communication component and to the third agent communication component;

transmitting, from the second agent communication component, the second agent parameter signal to the third agent communication component;

instructing, via the first agent controller, the first autonomous agent to perform the subsequent first agent task based on the first agent parameter signal, the second agent parameter signal, the third agent parameter signal and a predetermined reward function using reinforcement learning and a first Kalman consensus filter;

instructing, via the second agent controller, the second autonomous agent to perform the subsequent second agent task based on the first agent parameter signal, the second agent parameter signal, the third agent parameter signal and the predetermined reward function using reinforcement learning and a second Kalman consensus filter; and instructing, via the third agent controller, the third autonomous agent to perform the subsequent third agent task based on the first agent parameter signal, the second agent parameter signal, the third agent parameter signal and the predetermined reward function using reinforcement learning and a third Kalman consensus filter, transmitting, via the second agent communication component, the received third agent parameter signal to the first agent communication component;

transmitting, via the third agent communication component, the received second agent parameter signal to the first agent communication component;

outputting, via a first Kalman consensus filter of the first agent controller that comprises a task controller and the first Kalman consensus filter, output a second agent parameter consensus based on the second agent parameter signal received from the second agent communication component and the received second agent parameter signal received from the third agent communication component;

instructing, via the task controller, the first autonomous agent to perform the subsequent first agent task based on the second agent parameter consensus;

generating, via a Kalman filter component of the first Kalman consensus filter that comprises the Kalman filter component and a distributed average consensus component, a local state signal; and generating, via the distributed average consensus component, the second agent parameter consensus based on a weighted average of a first product of the second agent parameter signal received from the second agent communication component and a first weighting factor of the second agent parameter signal received from the second agent communication component and a second product of the received second agent parameter signal received from the third agent communication component and the second weighting factor of the received second agent parameter signal received from the third agent communication component, wherein the first weighting factor is based on distance, wherein the first agent area is less than and within the total area of operation, and wherein the second agent area is less than and within the total area of operation.

4. The method of claim 3, wherein the first agent detector comprises a detector selected from a group of detectors comprising a position detector, a velocity detector, an acceleration detector and combinations thereof, wherein the position detector is operable to detect a position selected from a group of positions comprising a first agent position of the first autonomous agent, a second agent position of the second autonomous agent when the second autonomous agent is within the first agent area and a combination thereof, wherein the velocity detector is operable to detect a velocity selected from a group of velocities comprising a first agent velocity of the first autonomous agent, a second agent velocity of the second autonomous agent when the second autonomous agent is within the first agent area and a combination thereof, and wherein the acceleration detector is operable to detect an acceleration selected from a group of accelerations comprising a first agent acceleration of the first autonomous agent, a second agent acceleration of the second autonomous agent when the second autonomous agent is within the first agent area and a combination thereof.

* * * * *